(12) United States Patent
DeVries

(10) Patent No.: US 8,556,068 B2
(45) Date of Patent: Oct. 15, 2013

(54) METHOD AND APPARATUS FOR TRACKING CONVEYOR BELTS

(75) Inventor: Brett E. DeVries, Comstock Park, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 146 days.

(21) Appl. No.: 13/104,922

(22) Filed: May 10, 2011

(65) Prior Publication Data

US 2011/0272250 A1 Nov. 10, 2011

Related U.S. Application Data

(60) Provisional application No. 61/333,178, filed on May 10, 2010.

(51) Int. Cl.
*B65G 15/08* (2006.01)

(52) U.S. Cl.
USPC .......................... 198/807; 198/806; 198/810.3

(58) Field of Classification Search
USPC ....................................... 198/806, 807, 810.3
See application file for complete search history.

(56) References Cited

U.S. PATENT DOCUMENTS

| | | | | |
|---|---|---|---|---|
| 2,160,057 A | * | 5/1939 | Carus et al. ................... | 198/806 |
| 2,225,276 A | * | 12/1940 | Parker ........................... | 198/806 |
| 2,256,685 A | | 9/1941 | Parker | |
| 2,653,700 A | | 9/1953 | Sloane | |
| 2,725,757 A | * | 12/1955 | Murphy ........................ | 198/806 |
| 3,001,680 A | | 9/1961 | Nitkiewicz | |
| 3,066,547 A | * | 12/1962 | Evans et al. .................... | 198/806 |
| 3,368,665 A | * | 2/1968 | Jinkins ........................... | 198/806 |
| 3,593,841 A | * | 7/1971 | Leow ............................. | 198/806 |
| 3,596,817 A | | 8/1971 | Morse et al. | |
| 3,603,451 A | * | 9/1971 | Promin et al. ................. | 198/807 |
| 3,621,728 A | * | 11/1971 | Steorts, Jr. ..................... | 198/808 |
| 5,358,098 A | * | 10/1994 | Sundstrom et al. ........... | 198/806 |

(Continued)

FOREIGN PATENT DOCUMENTS

| | | |
|---|---|---|
| CH | 686 507 A5 | 4/1996 |
| FR | 2 586 235 A1 | 2/1987 |

(Continued)

OTHER PUBLICATIONS

Brochure "Persuader™ PT Smart™ Belt Trainer Instructions for Installation" issued by Flexible Steel Lacing Company, Feb. 2001 (4 pages).

(Continued)

*Primary Examiner* — Patrick Mackey
(74) *Attorney, Agent, or Firm* — Fitch, Even, Tabin & Flannery, LLP

(57) ABSTRACT

A conveyor belt tracking apparatus is provided for correcting the travel path of a laterally mistracking conveyor belt. In one form, an elongate tracking roller is rotatably mounted at end portions thereof to a pivotal support frame and extends across and below the belt. The pivotal support frame is mounted to a downstream pivot member so that belt mistracking toward one end portion of the tracking roller causes the one end portion to shift downstream and laterally outwardly to urge the belt toward the correct travel path. In one approach a downstream pivot connection between the pivot member and pivotal support frame is inclined upstream so that the end portion also shifts upwardly as it shifts downstream to urge the mistracking belt edge toward the correct travel path.

33 Claims, 17 Drawing Sheets

(56) References Cited

U.S. PATENT DOCUMENTS

| | | | |
|---|---|---|---|
| 5,609,241 A | | 3/1997 | Shaw |
| 5,950,806 A | * | 9/1999 | Warneke ............... 198/806 |
| 6,116,410 A | * | 9/2000 | Malmberg ............. 198/806 |
| 6,131,726 A | | 10/2000 | Hovsto et al. |
| 7,051,967 B2 | | 5/2006 | Kitajima |
| 7,614,493 B2 | | 11/2009 | Dowling et al. |
| 7,669,709 B2 | * | 3/2010 | Hovsto et al. ......... 198/806 |
| 2009/0178901 A1 | | 7/2009 | Hovsto et al. |

FOREIGN PATENT DOCUMENTS

| | | |
|---|---|---|
| GB | 608907 A | 9/1948 |
| WO | 97/41051 A1 | 11/1997 |
| WO | 2009/016484 A1 | 2/2009 |

OTHER PUBLICATIONS

Brochure "PT Max™ Belt Trainer Top Side and Return Side Instructions for Installation" issued by Flexible Steel Lacing Company, Jul. 2008 (4 pages).
Brochure "Persuader™ PT Max™ Belt Trainer" issued by Flexible Steel Lacing Company, Aug. 2003 (2 pages).
Brochure "Persuader™ PT Max™ and PT Smart™ Belt Trainers" issued by Flexible Steel Lacing Company, Jul. 2000 (2 pages).
Brochure "Persuader™ Trainers and Positioners Selection Guidelines" issued by Flexible Steel Lacing Company, Feb. 2001 (2 pages).
Brochure "PT Max™ Belt Trainers" issued by Flexible Steel Lacing Company, Feb. 2008 (2 pages).
Brochure "PT Max™ Belt Trainers" issued by Flexible Steel Lacing Company, Jun. 2011 (2 pages).
"PT Max Return Side Data Sheet" issued by Flexible Steel Lacing Company, Jun. 2009 (1 page).
"PT Max V-Return Side Data Sheet" issued by Flexible Steel Lacing Company, Jun. 2009 (1 page).
"PT Max Top Side Data Sheet" issued by Flexible Steel Lacing Company, Jun. 2009 (1 page).
"PT Max Roller Data Sheet" issued by Flexible Steel Lacing Company, Jun. 2009 (1 page).
Notification of Transmittal of the International Search Report and the Written Opinion of the International Searching Authority, or the Declaration from the International Bureau of WIPO for International Application No. PCT/US2011/035991, dated May 10, 2011, 14 pages.

\* cited by examiner

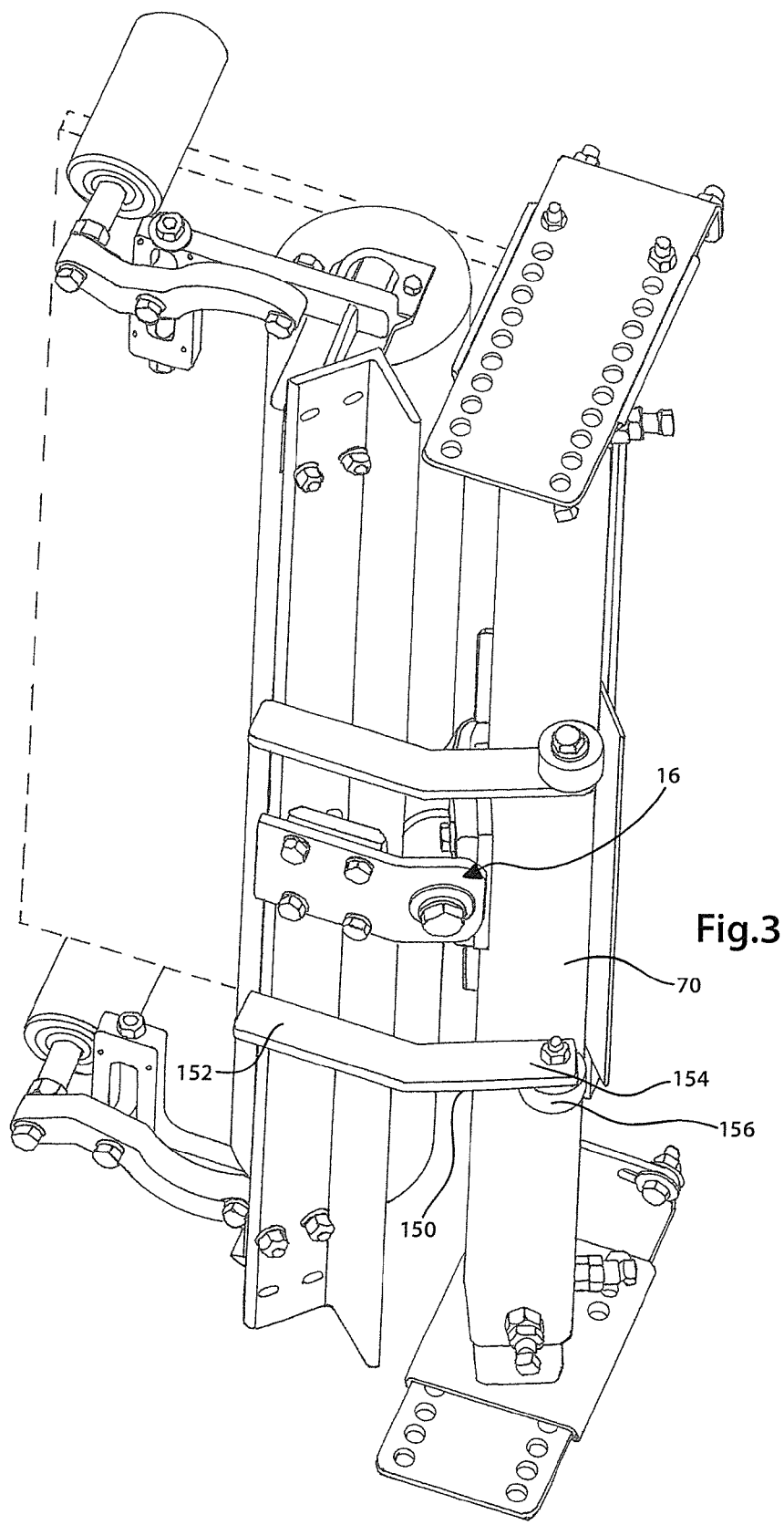

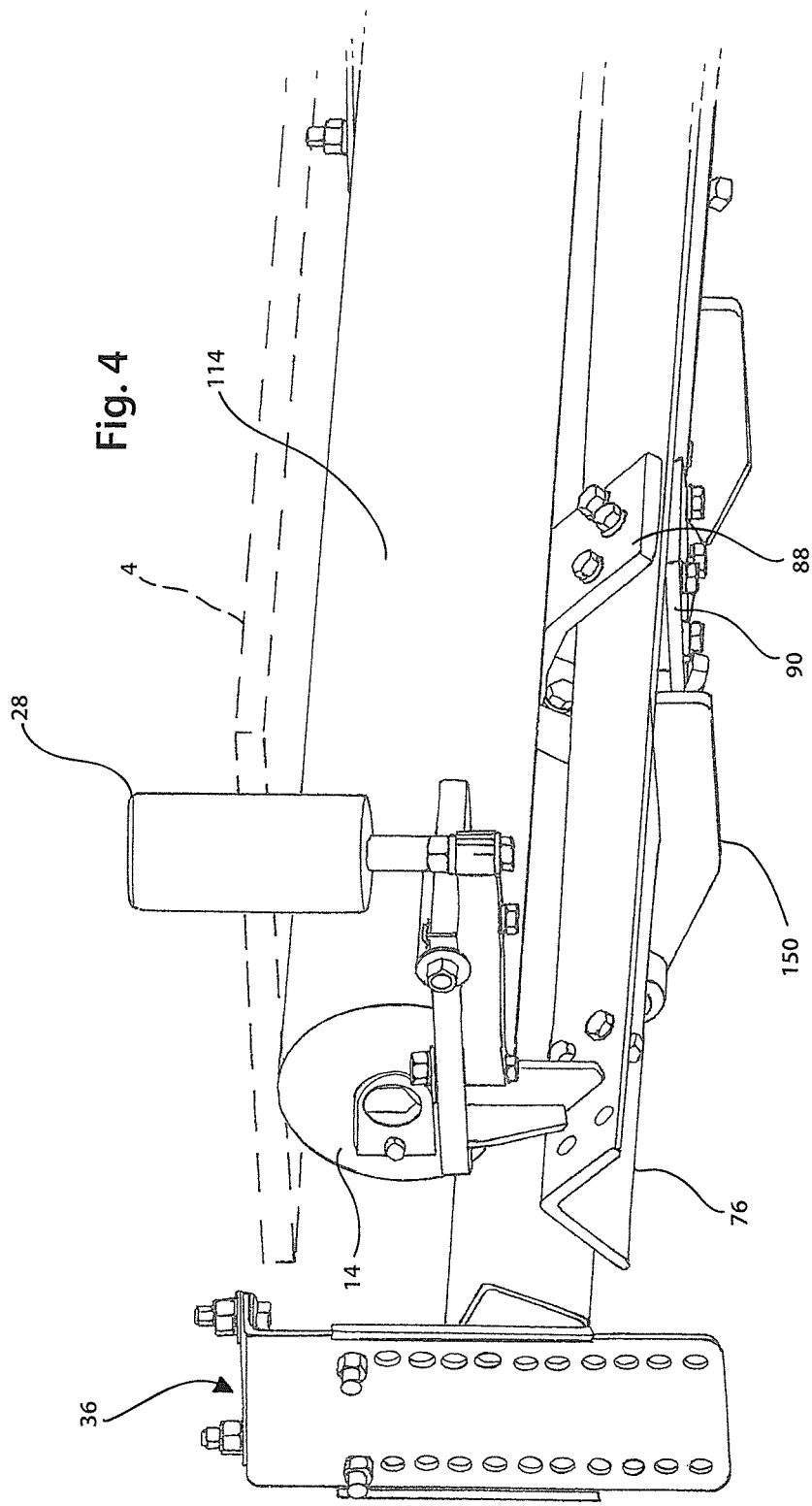

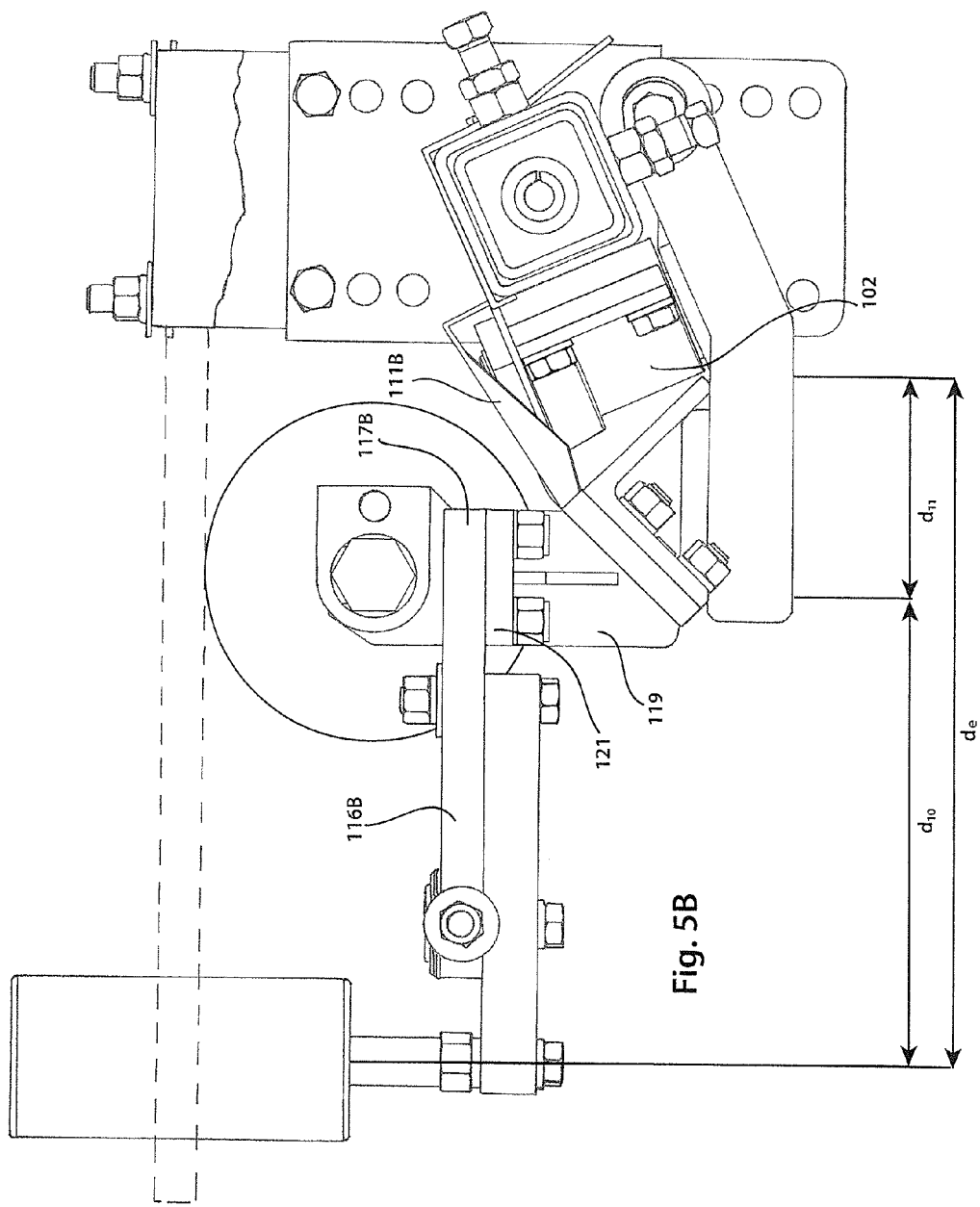

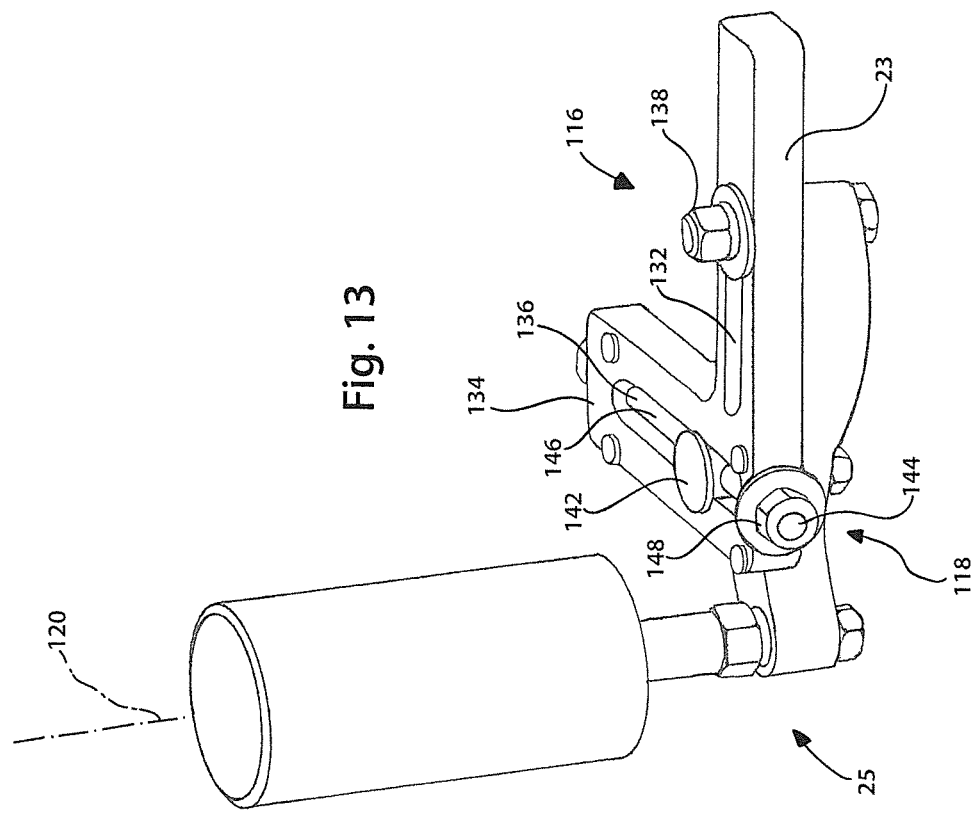
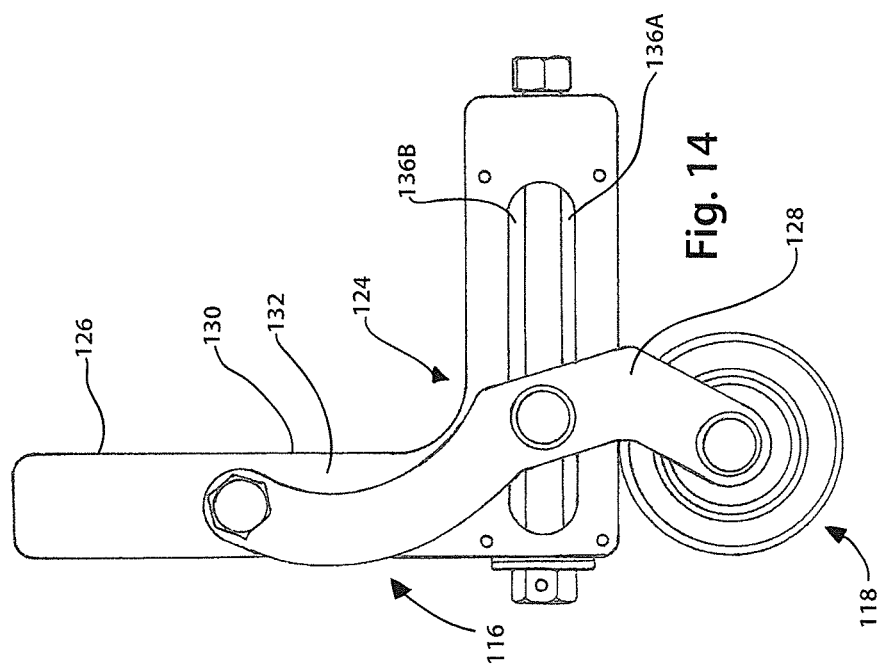

METHOD AND APPARATUS FOR TRACKING CONVEYOR BELTS

CROSS REFERENCE TO RELATED APPLICATIONS

This application claims benefit under 35 U.S.C. 119 (e) to U.S. Provisional Application No. 61/333,178 entitled "Method and Apparatus for Tracking Conveyor Belts" filed May 10, 2010, the contents of which are incorporated herein by reference in its entirety.

FIELD OF THE INVENTION

The invention relates to conveyor belt tracking apparatuses and methods for tracking conveyor belts.

BACKGROUND

Rollers for conveyor belts are arranged so that the conveyor belt travels thereover in a downstream belt travel direction and path. However, conveyor belts can tend to meander or mistrack toward one side or the other of the rollers such as due to uneven loads carried by the belt. Conveyor belt tracking devices have been developed that respond to belt mistracking to attempt to redirect the belt back to its correct travel path substantially central on the conveyor rollers.

Conveyor belt trackers have commonly included a pivoting system that provides pivoting of one or more idler or tracking rollers in response to mistracking of the conveyor belt. In response to the belt mistracking, the idler roller is shifted so that the one end portion of the idler roller shifts downstream. So configured, the idler roller steers the conveyor belt back toward the desired belt travel path. One such belt tracker is disclosed in U.S. Pat. No. 2,225,276 to Parker and includes an idler roller that is pivotal about a pivot axis that is inclined in the downstream direction. In this regard, when a conveyor belt mistracks toward one end portion of the idler roller, the drag forces acting downstream on the idler roller end portion increase urging the end portion to shift downstream, while the downstream tilt of the pivot axis causes the idler roller end portion to also shift downwardly under the increased weight of the mistracked belt passing over the end portion. Thus Parker's belt tracker utilizes the weight of the conveyor belt and drag forces acting on the end portion toward which the belt is mistracking to energize the idler roller to pivot about the pivot axis. The system described by Parker, however, is largely ineffective at influencing and changing the path of the belt in applications and conditions where condensation, ice, or debris would accumulate at the interface between the idler roller and the conveyor belt.

Applicant's assignee herein provided a previous version of a PT Smart™ belt tracker that had both sensor rollers and an idler roller. The sensor rollers were oriented upstream from the idler roller and arranged on either side of the belt. The sensor rollers were operatively connected to the idler roller so that when belt mistracking caused the belt to engage one of the sensor rollers, this engagement force was transferred to the idler roller to provide it energy for pivoting to correct the path of the mistracking belt. In this regard, the idler roller was positioned downstream of its pivot axis and the pivot axis was inclined in the upstream direction, so that upon the mistracking conveyor belt edge providing sufficient energy to the sensor roller through engagement with the sensor roller toward which it was mistracking, the corresponding end portion of the idler roller would shift upwardly and downstream. In this manner, the upwardly shifted end portion of the roller would engage the conveyor belt edge passing thereover to increase the tension in the belt edge and urge the conveyor belt to shift toward the belt travel direction. In other words, the conveyor belt would tend to move away from the edge having high tension and toward the opposite conveyor belt edge with lower tension.

While effective, a substantial amount of force was required from the belt edge engaging the sensor roller to shift the one end portion upwardly in the previous PT Smart™. This force could more quickly wear the belt edges as they engaged the sensor rollers. In addition, the sensor arms extended far upstream of the idler roller to maximize the torque about the pivot axis from the energizing forces between the belt edge and the sensor rollers. These long torque arms required a significant amount of outward lateral displacement of the sensor rollers to generate a sufficient shifting of the tracking roller necessary to correct the path of the mistracking belt. Because conveyor belt systems can be utilized with tight lateral constraints on either side, the previous PT Smart™ was not optimal for such applications.

In addition, laterally inward shifting of the end portion of the tracking roller underneath the mistracking edge of the belt allowed the mistracking edge of the conveyor belt shifting laterally in the opposite direction to shift off of and out of engagement with the idler roller. However, steering the conveyor belt by shifting the end portion located at the side of the belt tracker toward which the belt is mistracking downstream relies on contact and corresponding friction between the conveyor belt and the idler roller. Thus, in these systems, because the conveyor belt would shift off the end of the idler roller, the amount of contact between the belt and roller was reduced, thereby reducing the effectiveness of the steering mechanism for correcting the direction of the mistracking belt. This is particularly problematic when the interface between the belt and idler roller gets wet since the already reduced surface contact and corresponding frictional forces between the belt and roller are further reduced making it more difficult for the idler roller to effectively influence and change the path of the belt.

SUMMARY OF THE INVENTION

In accordance with one aspect of the present invention, a conveyor belt tracking apparatus is provided having an elongate tracking roller that is pivotal about a downstream pivot connection for providing instability of the tracking roller about the pivot connection in response to mistracking of a conveyor belt traveling thereover in a generally longitudinal downstream direction. In this regard, upon mistracking of the conveyor belt toward an end portion of the tracking roller, the tracking roller pivots about the downstream pivot connection such that the end portion shifts downstream and laterally away from the pivot connection. In this manner, an energizing torque created by drag forces acting between the tracking roller and the mistracking edge of the belt traveling thereover is increased as the end portion of the tracking roller shifts laterally further away from the pivot connection. The pivot connection is also preferably inclined in an upstream direction such that as the one end portion shifts downstream and laterally away from the pivot connection in response to mistracking of the conveyor belt it also shifts upwardly to increase tension in the mistracking edge of the conveyor belt traveling thereover. In this regard, the tracking roller steers the conveyor belt toward a desired generally central belt travel path both by shifting the tracking roller so that the end portion toward which the belt is mistracking is positioned downstream of the opposite end portion of the tracking roller and by increasing the tension in the mistracking edge of the conveyor belt relative to the opposite edge of the conveyor belt. In addition, the present belt tracking apparatus does not require large energizing forces from engagement between the mistracking conveyor belt edge and adjacent sensor rollers to shift the end of the tracking roller upwardly against the weight of the conveyor belt.

Because the pivot connection is inclined in the upstream direction so that the end portion of the tracking roller toward which the conveyor belt is mistracking is shifted upwardly upon belt mistracking, the tension in the mistracking lateral edge portion of the conveyor belt traveling thereover is increased. In this regard, the belt is urged to return toward the desired belt travel path because the belt will tend to shift away from the mistracking lateral belt edge having high tension and toward the opposite belt edge having lower tension. In addition, the belt is urged to return toward the belt travel path even in conditions where the friction at the interface between the conveyor belt and the tracking roller is reduced, for example by condensation, ice, or debris at the interface. This overcomes several problems with previous belt tracking systems utilizing a tracking roller pivotable about a pivot axis that is inclined in the downstream direction, which were ineffective in correcting a belt travel path in adverse conditions that reduced the friction between the tracking roller and the conveyor belt.

More particularly, Applicants have discovered that in these prior systems, because the end portion toward which the belt mistracks shifts downwardly as it shifts downstream, the tension of the mistracking belt edge is decreased as it passes over the lowered end portion. In addition, the opposite end portion is shifted upwardly, actually increasing the tension in the opposite lateral edge of the belt. In this regard, the tension in the belt would urge the belt to mistrack even further. In other words, the conveyor belt would tend to shift toward the lower tension side which is the side of the belt that is lowered. Accordingly, it has been found that in these systems, when the friction at the interface between the conveyor belt and the idler roller is reduced the further mistracking of the belt caused by the downward shifting of the idler roller one end portion could greatly offset and reduce the corrective influence of the one end portion being shifted downstream to steer the conveyor belt and in some situations could actually overcome the steering effect of the downstream shifting of the one end portion, so that the belt is even further mistracked. In this regard, the present belt tracking apparatus includes the pivot connection inclined in the upstream direction to utilize the upward shifting of the end portion of the tracking roller to urge the conveyor belt away from the mistracking conveyor belt edge and toward the desired belt travel path.

In addition, as mentioned previously, the present belt tracking apparatus has the pivot connection positioned downstream of the tracking roller to provide dynamic instability of the tracking roller about the pivot connection to create sufficient energizing force to shift the end portion of the tracking roller to which the conveyor belt is mistracking upward against the weight of the conveyor belt and the increased tension formed in the edge of the conveyor belt. In this regard, applicant's discovered that prior devices utilized tracking rollers positioned downstream of the pivot axis so that mistracking of the belt toward one side of the apparatus would cause the end portion of the tracking roller located at that side to also shift inwardly laterally toward the pivot connection as it shifted downstream. In this regard, the end portion would be positioned laterally at a smaller distance from the pivot connection so that the torque created from drag forces acting between the tracking roller and the conveyor belt at the end portion needed to energize the tracking roller to pivot about the pivot connection decreased as the tracking roller continued to pivot about the pivot connection because the effective torque arm became shorter.

In this regard, the present belt tracking apparatus includes a downstream pivot connection for energizing the tracking roller to pivot about the downstream pivot connection and shift the end portion toward which the belt is mistracking upwardly without relying on large forces between the mistracking edge of the conveyor belt and adjacent sensor rollers, thereby decreasing the wear on the lateral edges of the conveyor belt. In this manner, it has been discovered that upon mistracking of the conveyor belt toward one end portion of the tracking roller, the one end portion also shifts laterally outwardly away from the pivot connection as it pivots about the pivot connection, thereby increasing the distance between the end portion and the pivot connection. In this regard, the energizing torque that the drag forces acting between the conveyor belt and the tracking roller end portion provide for shifting the one end portion downstream and upwardly are enhanced to provide sufficient energizing force to shift the end portion upwardly against the weight of the conveyor belt edge portion passing thereover and the increased tension in the lateral edge of the conveyor belt caused by the upward shifting of the tracking roller end portion.

In addition, because the tracking roller is positioned upstream of the pivot connection so that the end portion of the tracking roller toward which the conveyor belt mistracks shifts laterally away from the pivot connection, the surface contact and corresponding friction between the tracking roller and the conveyor belt is increased over prior approaches. More particularly, as the conveyor belt mistracks toward the one end portion of the tracking roller, the end portion advantageously shifts laterally in the same direction to remain underneath the mistracking edge of the conveyor belt maintaining the surface contact between the end portion and the mistracking edge of the conveyor belt to increase the corrective effect that the tracking roller has on the conveyor belt, unlike prior approaches where the mistracking lateral edge of the conveyor belt could shift off the edge of the tracking roller.

BRIEF DESCRIPTION OF THE DRAWINGS

FIG. 3 is perspective view of the conveyor belt tracking assembly of FIG. 1A from below the belt tracking assembly;

FIG. 4 is a perspective view of the conveyor belt tracking assembly of FIG. 1A from generally upstream of the belt tracking assembly;

FIG. 5B is a partial cut-away side view of the conveyor belt tracking assembly of FIG. 1B showing the tracking roller positioned upstream of the pivot connection and the sensor rollers positioned upstream of the tracking roller and showing the sensor arm mounted to a support member with bolts;

FIG. 13 is a perspective view of a sensor roller rotatably mounted on an arm portion including an adjustment mechanism for adjusting the lateral position of the sensor roller;

FIG. 14 is a bottom view of the sensor roller mounted on an arm portion of FIG. 13 showing the slidable connections between the movable support member and the fixed support elbow;

DETAILED DESCRIPTION OF THE PREFERRED EMBODIMENTS

Figure 1A:
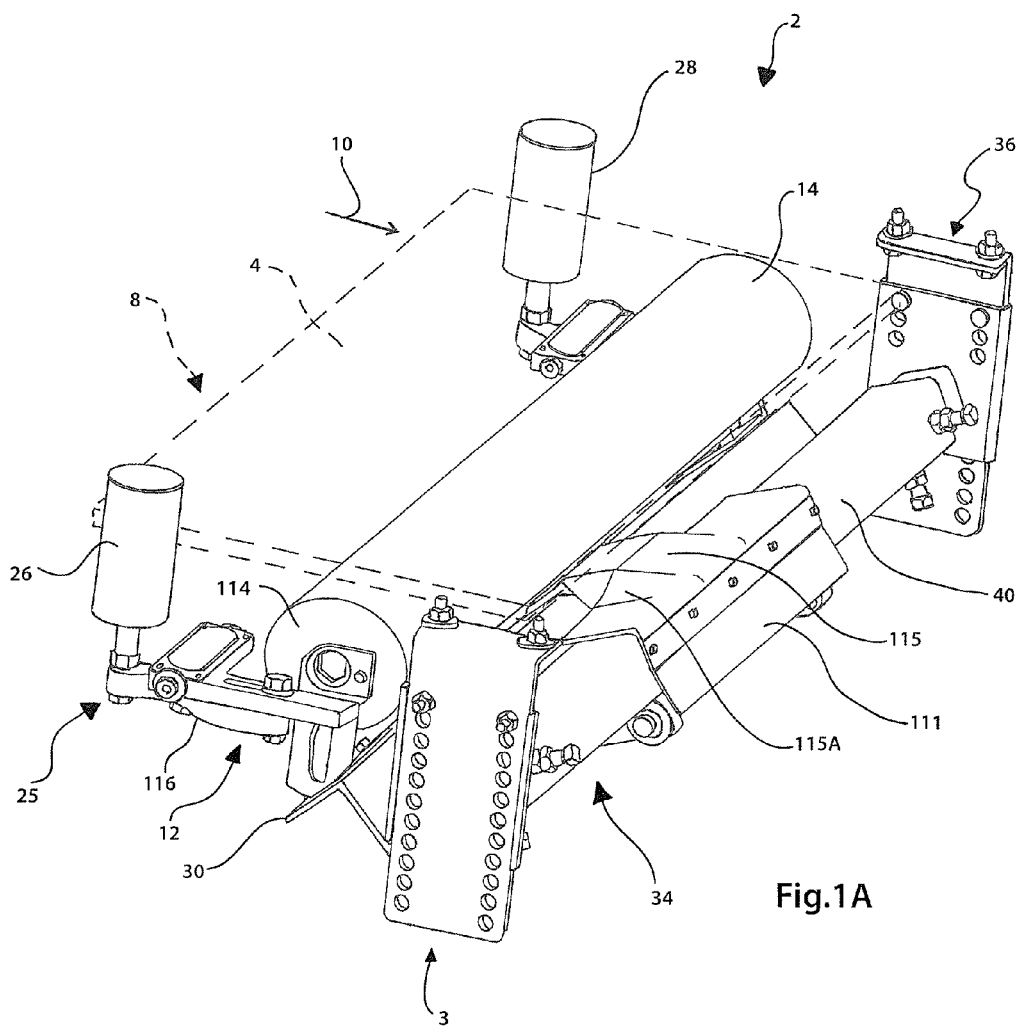
FIG. 1A is a perspective view of a conveyor belt tracking assembly in accordance with the present invention showing a tracking roller pivotable about a downstream axis that is inclined in the upstream direction positioned to rotatably engage a conveyor belt traveling thereover.
Figure 1B:
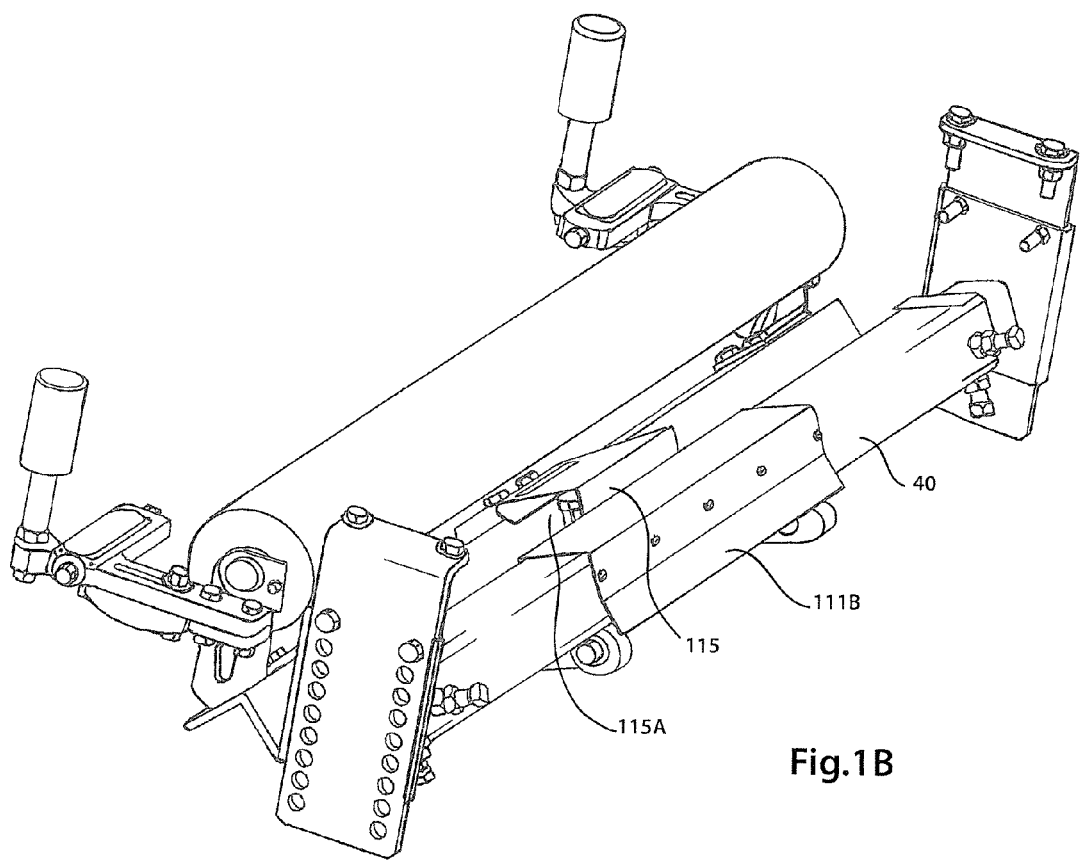
FIG. 1B is a perspective view of a conveyor belt tracking assembly in accordance with another approach.
Figure 2:
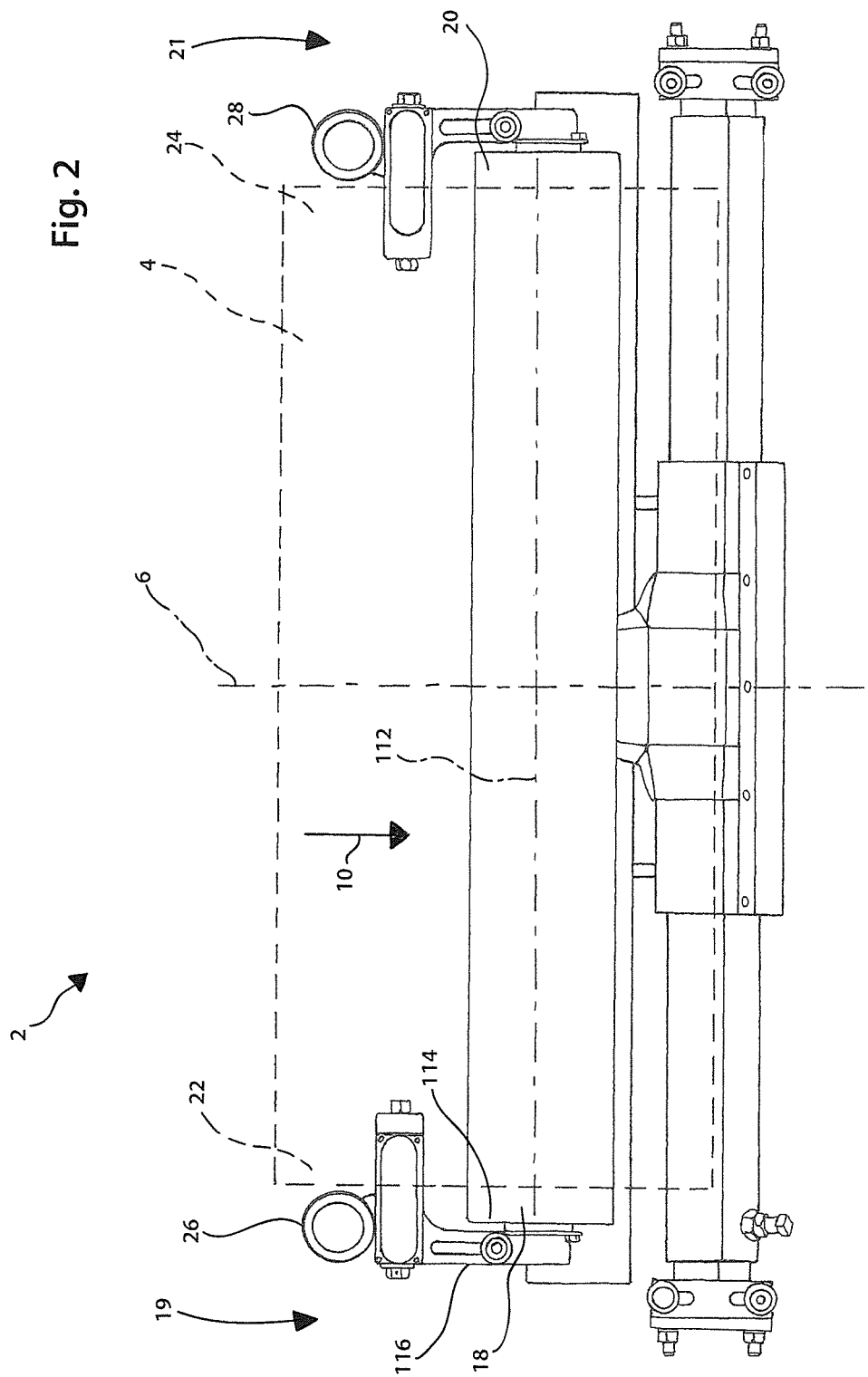
FIG. 2 is a top plan view of the conveyor belt tracking assembly of FIG. 1A.

As illustrated in FIGS. 1A-4, a conveyor belt tracking apparatus 2 is well adapted to be utilized with a return run of an endless conveyor belt system (not shown) and is shown positioned under a conveyor belt 4 thereof to track the belt 4 along a generally longitudinal belt travel path, the center of which is indicated at broken line 6 in FIG. 2. To this end, the present conveyor belt tracking apparatus 2 will be described with respect to the return run 8 of an endless conveyor belt 4; however, it will recognized that the principles described herein for the conveyor belt training apparatus 2 can be adapted for use at other locations along the conveyor belt system including beneath the top run of the belt 4. Accordingly, the terminology relating to the orientation of the various components and portions thereof of the belt training apparatus 2 will be in reference to the return run 8 as it passes over the conveyor belt tracking apparatus 2 in a generally longitudinal downstream belt travel direction 10 along the belt travel path 6, and it will be recognized that these components and portions thereof will be oriented accordingly depending on the other locations at which the present belt tracking apparatus 2 may be utilized in accordance with the invention herein.

Figure 5A:
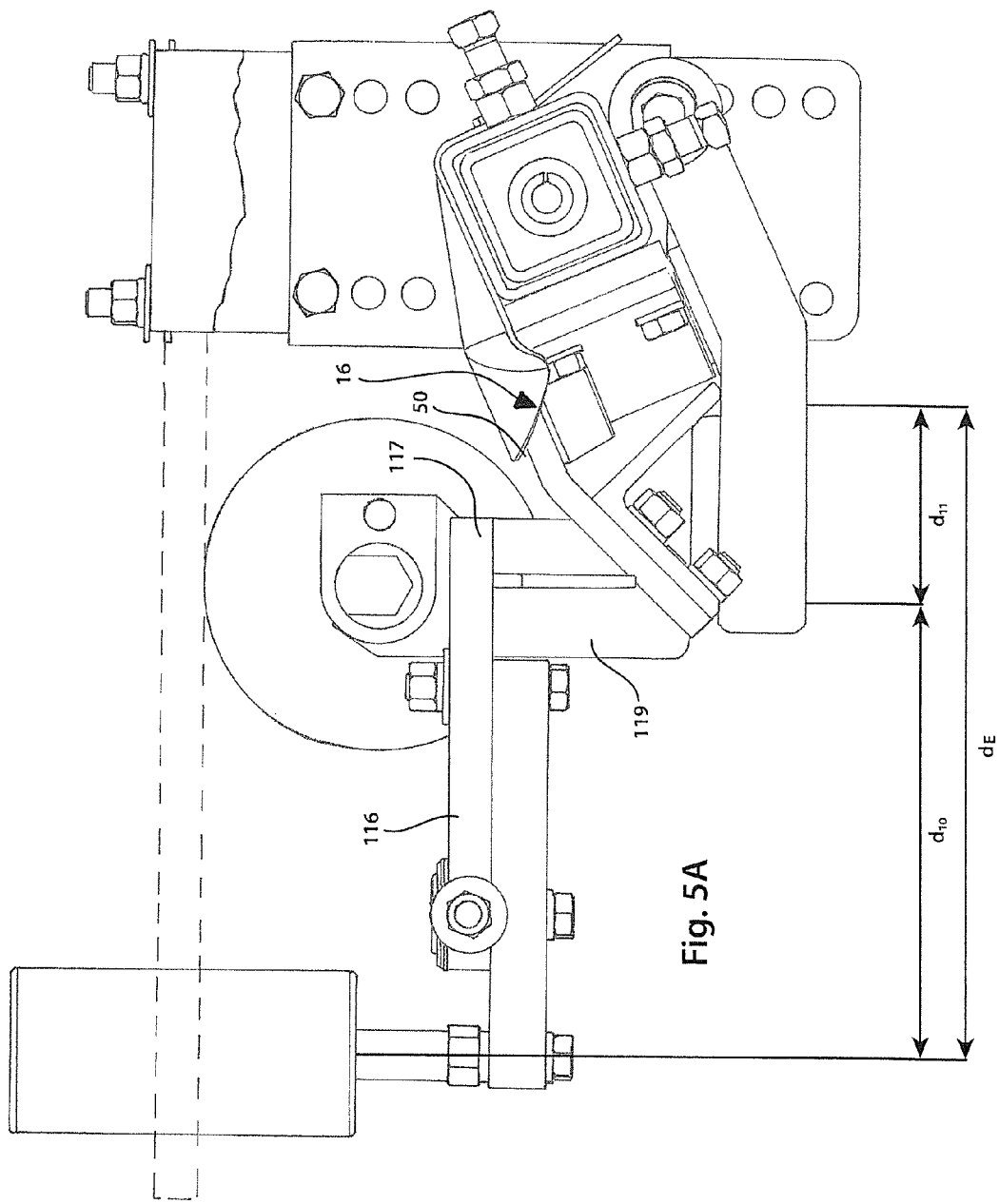
FIG. 5A is a partial cut-away side view of the conveyor belt tracking assembly of FIG. 1A showing the tracking roller positioned upstream of the pivot connection and the sensor rollers positioned upstream of the tracking roller.
Figure 6:
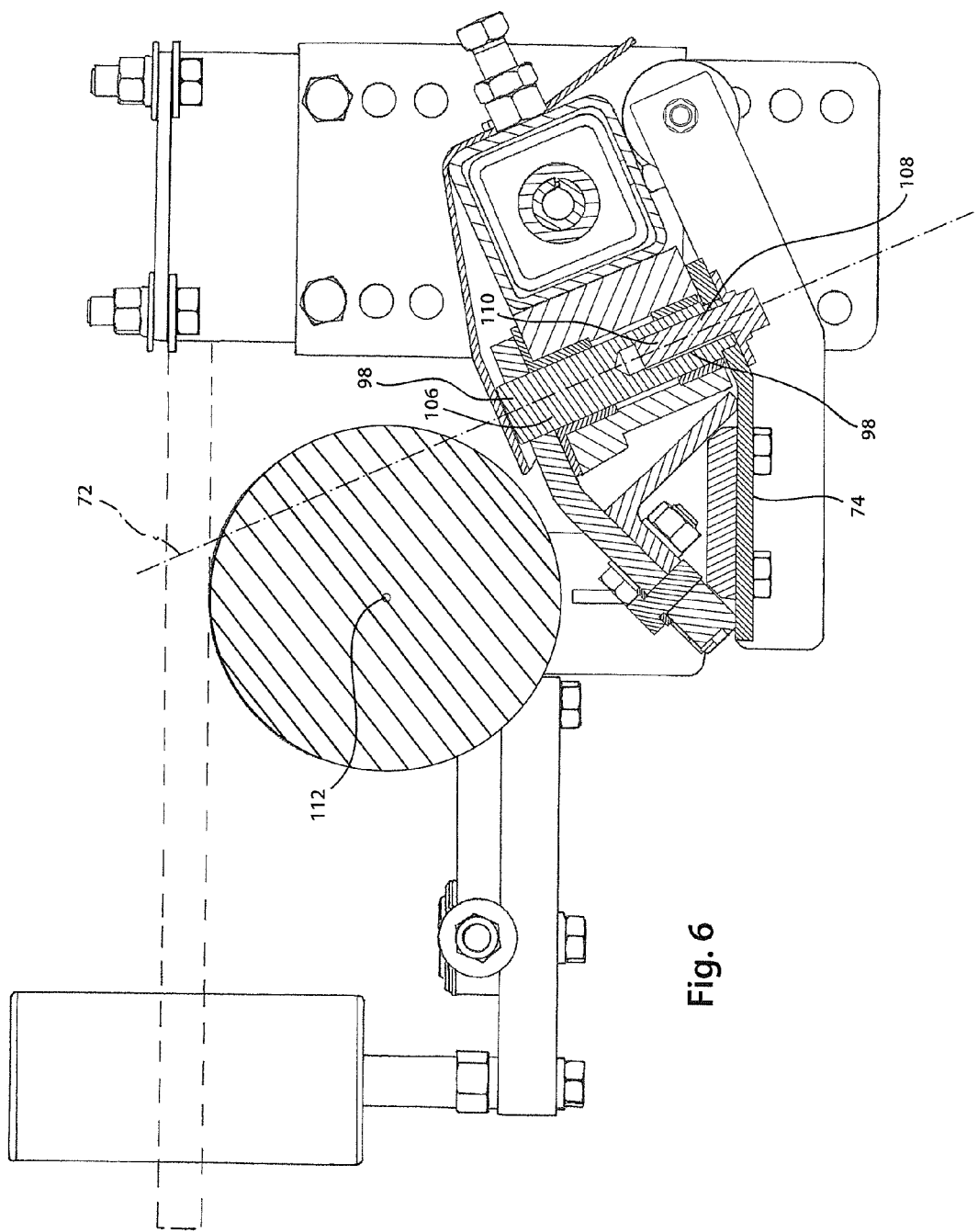
FIG. 6 is a side cross-sectional view of the conveyor belt tracking assembly of FIG. 1A showing the pivot shaft of the pivot connection within the pivot housing and attached to the extension portion of the tracking roller assembly.

In FIGS. 1A-4, the conveyor belt tracking apparatus 2 in accordance with the present invention is illustrated. The conveyor belt tracking apparatus 2 includes a frame assembly 3 including a pivotal tracking roller assembly 12 and a mounting frame assembly 34. The pivotal tracking roller assembly 12 includes a pivotal support frame and an elongate idler type tracking roller 14 rotatably mounted thereto for extending laterally across and underneath a conveyor belt 4 to rotate in engagement with the belt 4 as it travels thereover in the downstream belt travel direction 10. When the belt 4 is traveling in its correct path 6, it can be seen that the belt 4 will be centered on the tracking roller 14 as it extends orthogonally across the belt 4 (FIG. 2). The pivotal tracking roller assembly 12 is configured to pivot about a pivot connection 16 that is inclined in the upstream direction, as illustrated in FIGS. 5 and 6, in response to the belt 4 mistracking toward one end portion 18 of the tracking roller 14 so that the one end portion 18 shifts downstream and upwardly while the opposite end portion 20 shifts upstream and downwardly so that the tracking roller 14 is in a belt correcting position. For brevity, from here forward, the belt tracking apparatus 2 will be described during operation as having the belt mistracking toward the side 19 of the conveyor belt system at which the one end portion 18 of the tracking roller 14 is located. It should be understood, however, that the belt tracking apparatus 2 will work in the same manner, but in the opposite direction if the belt mistracks toward the opposite side 21 of the conveyor belt system at which the opposite end portion 20 of the tracking roller 14 is located during operation. Upon the conveyor belt mistracking toward the one end portion, the one end portion 18 lifts the conveyor belt mistracking lateral edge 22 traveling thereover to increase the tension in the lateral edge 22 relative to the opposite edge 24, which urges the conveyor belt 4 back toward the desired or correct belt travel path 6. In addition, shifting the end portion 18 downstream causes the tracking roller 14 to roll tangentially toward the direction of the belt travel path 6, which guides the belt 4 passing thereover to return toward the correct belt travel path 6.

In addition, the pivot connection 16 is positioned downstream of the tracking roller 14 to provide dynamic instability of the tracking roller 14 about the pivot connection 16 upon mistracking of the conveyor belt. More particularly, when the belt mistracks toward the one end portion 18 so that the tracking roller 14 begins to pivot about the pivot axis, the end portion 18 moves laterally further from the pivot connection 16, increasing the energizing torque being applied to the tracking roller assembly 12 about the pivot connection 16 to energize the tracking roller assembly 12 to more quickly move into a belt correcting orientation. In addition, this additional energizing torque is sufficient to overcome the force required to shift the one end portion 18 upwardly, which must overcome both the weight of the conveyor belt 4 and the increased tension being applied to the lateral edge 22 thereof. Moreover, having the pivot connection 16 positioned downstream of the tracking roller 14 provides a degree of outward lateral movement of the tracking roller 14 as the tracking roller 12 assembly pivots about the pivot connection 16. In this regard, the end portion 18 will remain underneath the lateral edge 22 of the laterally mistracking conveyor belt 4 even as it moves laterally outwardly so that the tracking roller 14 remains in engagement with the conveyor belt 4 across the entire lateral width thereof, thereby maximizing the corrective action provided by the tracking roller to the conveyor belt. In this manner, the surface area of contact between the conveyor belt 4 and the tracking roller 14 is increased, thereby increasing the corresponding friction between the belt 4 and the tracking roller 14 and the corrective influence the tracking roller 14 has to steer the conveyor belt toward the desired belt travel path 6.

In one approach, the belt tracking apparatus 2, as illustrated in FIGS. 1, 2, and 5, also includes sensor roller assemblies 25 including sensors mounted to the pivotal support frame 30 of the tracking roller assembly 12 for providing additional energizing force to pivot the tracking roller assembly 12 about the pivot connection 16 when the belt 4 mistracks. Preferably, the sensors include rotatable sensor rollers 26 and 28 that rotate along with the conveyor belt edge as the belt mistracks toward and contacts one of the sensor rollers 26 and 28. The sensor rollers 26 and 28 are configured to rotate about generally vertical axes and are positioned adjacent to the opposite lateral edges 22 and 24 of the conveyor belt 4 during operation. When the conveyor belt 4 mistracks laterally toward the one end portion 18, the lateral edge 22 will engage the sensor roller 26 providing an energizing force thereto for shifting the sensor roller 26, and a pivotal support frame end portion 32 to which it is mounted, downstream and upwardly about the pivot connection 16. The sensor rollers 26 and 28 may be advantageously positioned upstream of and in relatively close proximity to the tracking roller 14 so that the one end portion 18 may be shifted sufficiently downstream and upwardly with a relatively small amount of lateral shifting of the sensor roller 26 to reduce the amount of lateral clearance required adjacent to the sensor rollers 26 and 28. To this end, because the tracking roller 14 is positioned between the sensor rollers 26 and 28 and the pivot connection 16, the longitudinal distance between the sensor rollers 26 and 28 and tracking roller 14 may be relatively small while providing a larger effective longitudinal torque arm distance between the sensor rollers 26 and 28 and the pivot connection 16 to provide a relatively large amount of torque for pivoting the pivotal support frame 30 about the pivot connection 16 in response to receiving a relatively small amount of energizing force from engagement with the mistracked belt edge 22, thereby decreasing the wear on the belt edge 22 over time caused by engagement with the sensor roller 18.

Figure 7:
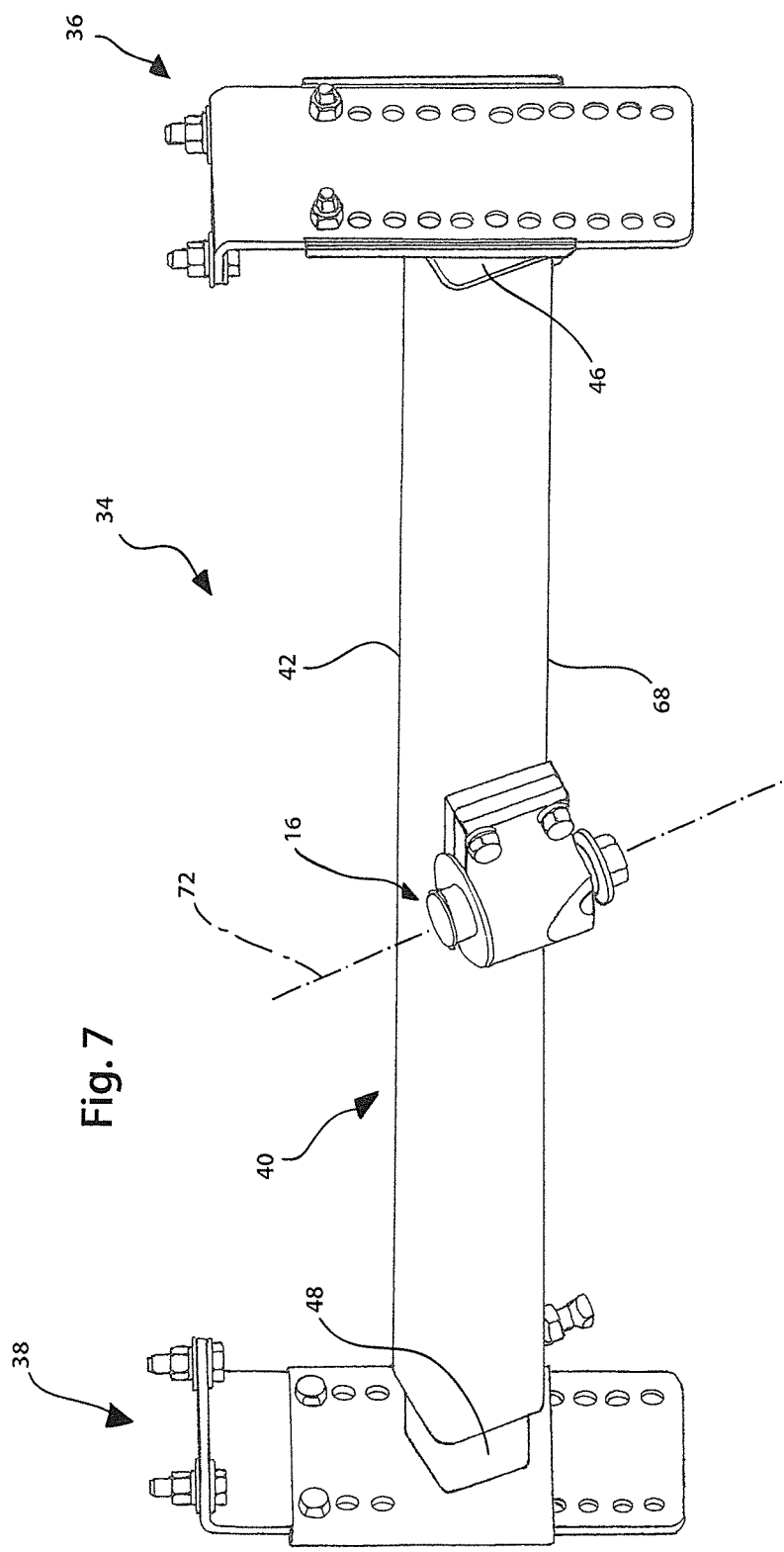
FIG. 7 is a perspective view of the mounting frame assembly for mounting to a conveyor system structure showing the pivot connection attached thereto.
Figure 8:
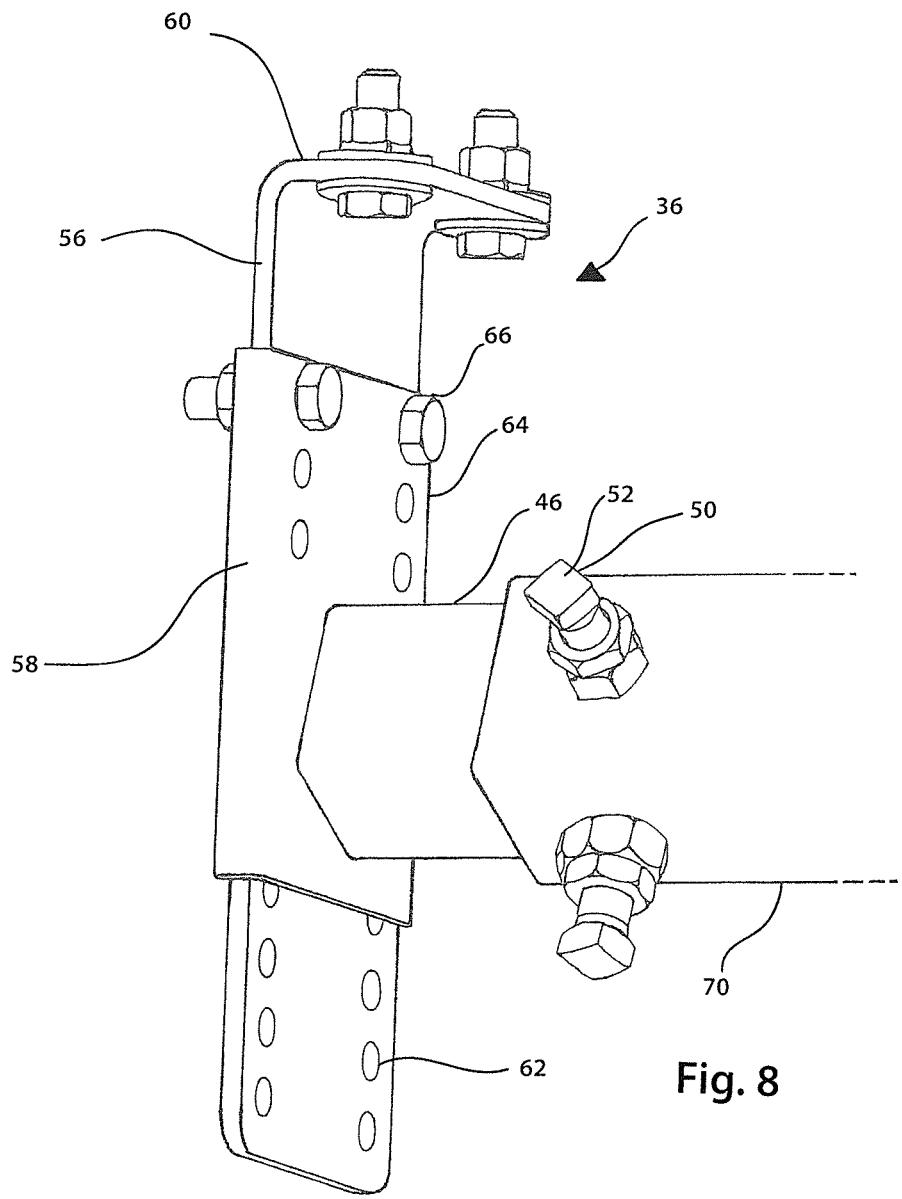
FIG. 8 is a perspective view of one mounting member of the mounting frame assembly and the telescopic arrangement of the support shaft for adjusting the length of the mounting frame.

With reference to FIGS. 7 and 8, the belt tracking apparatus 2 includes a mounting frame 34 with mounting members 36 positioned at lateral ends of an elongate support shaft 40 for connecting the mounting frame 34 to a conveyor support structure (not shown). In this regard, the mounting frame 34 is fixed relative to the conveyor support structure during operation. The elongate support shaft 40 extends underneath and transverse to the conveyor belt 4 between the mounting plates 36 for supporting the pivotal tracking roller assembly 12 via the pivot connection 16. To this end, the support shaft should be formed of sufficiently strong material, e.g. stainless steel to support the weight of the tracking roller assembly 12 and the conveyor belt 4 passing thereover.

In one example, the support shaft 40 includes a telescopic assembly having an outer center portion 42 in the form of an elongate hollow square tube and inner end portions 46 and 48 in the form of elongate hollow square tubes having smaller cross-sectional dimensions than the center portion 42. In this regard, the end portions 46 and 48 may be telescopically inserted into or extended out from the center portion 42 to respectively reduce or increase the overall length of the support shaft 40 for use with conveyor belt structures having different lateral widths. A locking mechanism 50 (FIG. 8) is utilized to fix the end portions 46 and 48 relative to the center portion 42 to fix the length of support shaft 40 at the necessary length for attachment to the conveyor belt structure for operation.

In one approach, the locking mechanism 50 includes one or more locking bolts 52 configured for removable insertion into corresponding apertures of the center portion 42 and end portions 46 and 48. The end portions 46 and 48 may have a series of such apertures extending along their lengths for locking the end portions 46 and 48 at discrete telescopic lengths. Alternatively, an operator can determine the appropriate length of the support shaft 40 for a particular conveyor belt structure and form apertures in the end portions 46 and 48 corresponding to the length. In any event, the locking bolt 52 may be secured into the apertures by any known method, including, for example, a threaded arrangement with the apertures or using a spring for biasing a tip of the bolt into the apertures. To adjust the length of the support shaft 40 the locking bolt 52 may be removed from the apertures so that the end portions 46 and 48 can move telescopically relative to the center portion 42. With the locking bolt 52 removed from the apertures, the end portions 46 and 48 can be adjusted inward and outward to decrease or increase the overall length of the support shaft 40.

In one approach, the mounting members 36 each have a two-part assembly, including a stationary bracket 56 and an adjustable plate 58. The stationary brackets 56 are attached to the conveyor belt structure (not shown) at opposite lateral sides thereof to fix the belt tracking apparatus 2 relative to the conveyor belt structure during operation. The adjustable plates 58 are each connected to one end of the support shaft 40, e.g. by welding the end portions 46 and 48 to the adjustable plates 58, and are configured to be removably attached to the stationary brackets 56 for securing each end of the support shaft 40 underneath and across the belt 4. More particularly, the stationary brackets 56 each include an upper attachment flange 60 that can be connected from underneath to the conveyor structure with the stationary brackets 56 extending downwardly therefrom to a position below the conveyor belt 4. The stationary brackets 56 include a plurality of apertures 62 for attachment with corresponding apertures 64 of the adjustable plates 58 at various heights thereon so that the tracking roller assembly 2 can be mounted with the tracking roller 14 engaging the conveyor belt 4 as it travels thereover.

As mentioned, the adjustable plates 58 include apertures 64 corresponding to the apertures 62 on the stationary brackets 56 so that the adjustable plates 58 can be positioned at the desired height and bolts 66 can be inserted through the corresponding apertures 62 and 64 to fix the adjustable plates 58 at the desired height. In this regard, the mounting frame 34 can be attached to the conveyor support structure and fixed relative thereto with the support shaft 40 extending across and underneath the conveyor belt 4. The belt tracking apparatus 2 can accommodate different conveyor belt systems due to the telescopically adjustable support shaft 40 and the adjustable height mounting members 36.

As mentioned previously, the support shaft 40 includes a center portion 42 formed of square metal tubing. In one approach, the support shaft 40 is tilted relative to the adjustable plate 58 and attached thereto, so that the support shaft 40 has upper and lower inclined surfaces, including upstream and downstream lower inclined surfaces 68 and 70. In this regard, the upstream lower inclined surface 68 of the support shaft 40 provides an attachment surface for the fixed pivot member 16 that is generally centered relative to the tracking roller end portions 18 and 20 and so that the pivot member is inclined in the upstream direction. To this end, the support shaft is tilted such that the upstream lower surface 68 is inclined upstream at about the same angle as a desired pivot axis 72 (FIGS. 6 and 7) of the pivot connection 16 about which the tracking roller assembly 12 pivots in a pivot plate generally orthogonal thereto, as described further below.

As mentioned previously, the tracking roller assembly 12 is pivotally connected to the mounting frame 34 by the pivot connection 16. The tracking roller assembly 12 includes the tracking roller 14 rotatably connected to the pivotal support frame 30 at opposite ends thereof, which supports the tracking roller 14 so that it rotates in engagement with the conveyor belt 4 as it travels thereover. The pivotal support frame 30 is pivotally connected to the mounting frame 34 at the fixed pivot connection 16 and includes an extension portion 74 of the pivotal support frame 30 extending upstream from the pivotal connection 16 to generally cantilever the pivotal support frame 30 upstream of the pivotal connection 16, as described further below.

Figure 9:
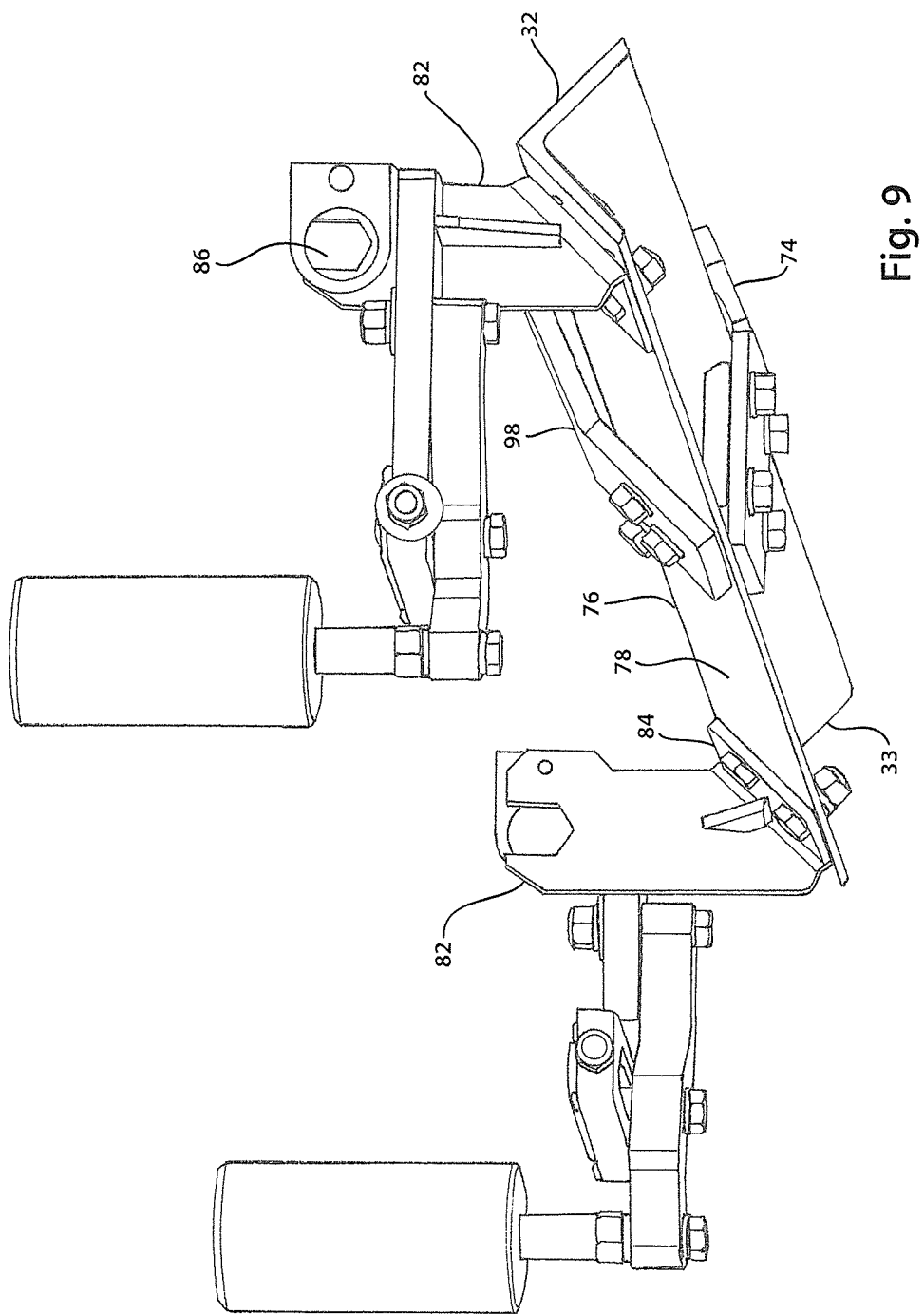
FIG. 9 is a perspective view of the pivotal support frame and sensor rollers attached.
Figure 10:
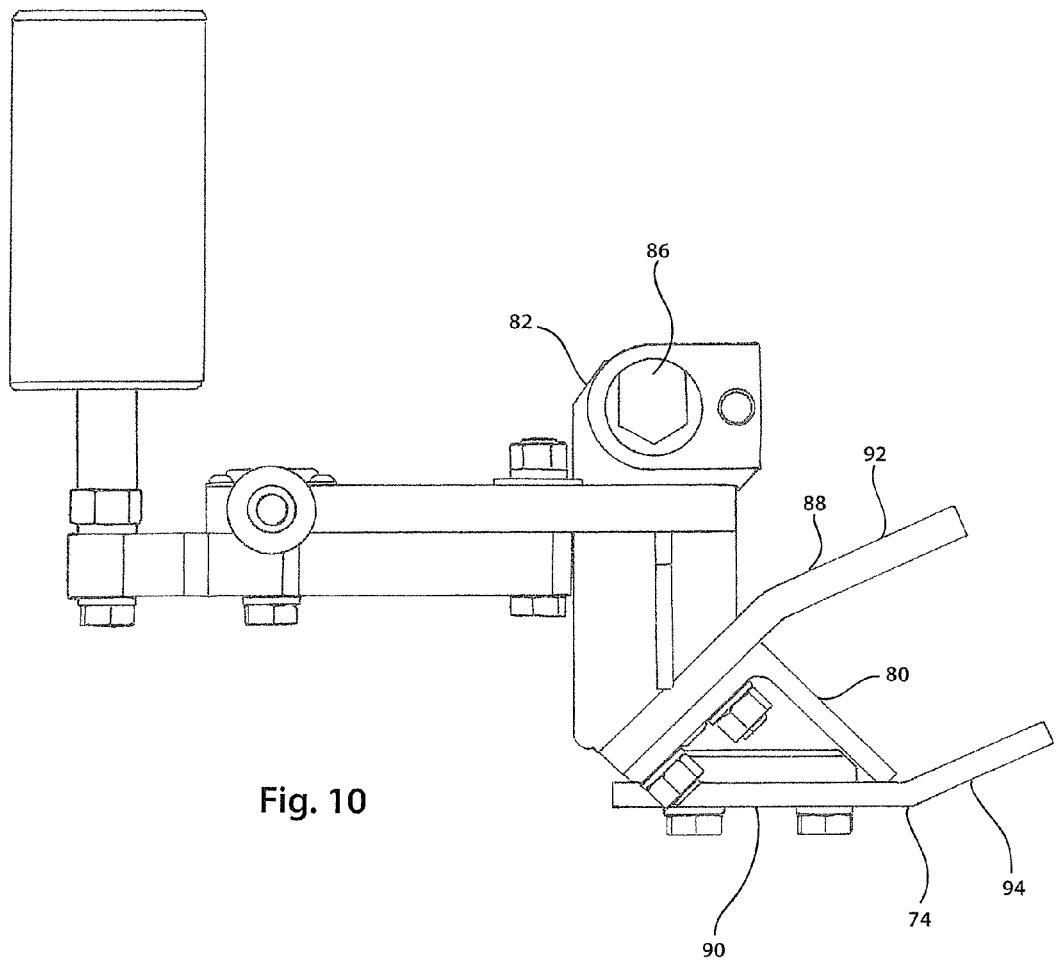
FIG. 10 is a side view of the pivotal support frame of FIG. 9 showing the extension portion for positioning the tracking roller upstream of the pivot connection.
Figure 11:
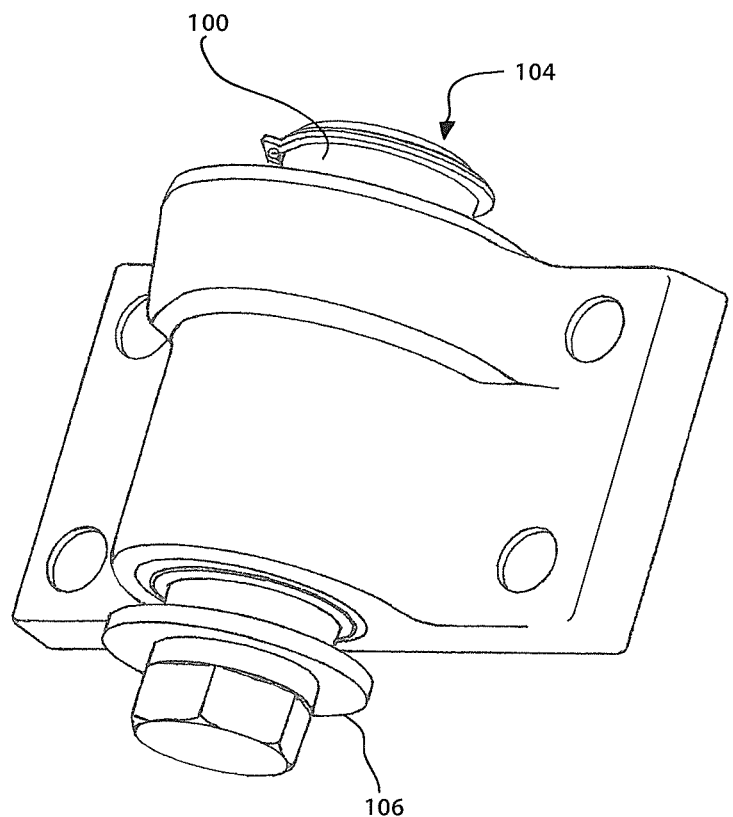
FIG. 11 is a perspective view of the pivot connection showing the pivot shaft captured within the pivot housing for rotation therein.

Referring to FIGS. 9 and 10, the pivotal support frame 30 includes an elongate support member 76 for extending across and underneath the conveyor belt 4 for rotatably supporting the tracking roller 14 thereon. In one example, the support member 76 includes an elongate inverted angle iron formed of steel or other sufficiently strong material for supporting the tracking roller 14 and the conveyor belt 4. The support member 76 includes upstream and downstream inclined faces 78 and 80. Upright supports 82 are positioned at opposite end portions 32 and 33 of the support member 76 for supporting the tracking roller 14 therebetween. The upright supports include bottom flanges 84, which are bolted or otherwise attached to the upstream inclined surface 78 so that the upright supports 82 extend generally vertically upward therefrom. Apertures 86 are formed in the upper portion of each of the upright supports 82 for receiving end support pins (not shown) from the tracking roller 14 about which the tracking roller rotates for supporting the tracking roller 14 between the upright supports 82. In this regard, the tracking roller 14 is rotatable about the pins, but is otherwise generally fixed relative to the pivotal support frame 30 so that the tracking roller 14 pivots about the pivot connection 16 with the pivotal support frame 30.

As mentioned, the pivotal support frame 30 also includes cantilever extension members 74 in the form of upper and lower support brackets 88 and 90 which are connected to the support member 76 at a generally laterally central position thereof. The upper support bracket 88 is attached to the upstream upper inclined surface 78 of the support member 76 and includes a tab extension 92 extending downstream therefrom. The lower support bracket 90 is attached to the bottom of the support member 34, and more particularly to a bottom surface of a bracket mounting member 94 which is attached, e.g. by welding, to the bottom of the support member 34. The bottom support bracket also includes a tab extension 96 extending downstream therefrom and generally parallel to the upper tab extension 92. The tab portions 92 and 96 each includes an aperture 98 for receiving a pivot shaft 100 for connection to the pivot connection 16 as described in further detail below. In this manner, the tracking roller 14 is positioned upstream of the pivot connection 16. In one example, the tracking roller is positioned about 3.3 inches upstream of the pivot connection 16.

Figure 12:
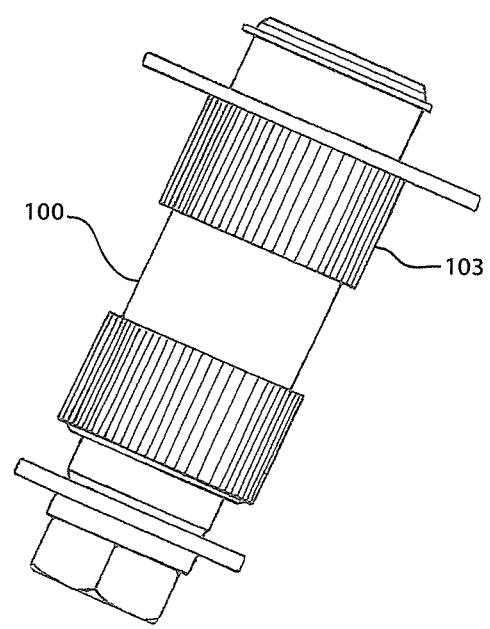
FIG. 12 is a perspective view of the pivot shaft removed from the pivot connection and showing bushings for reducing rotational friction between the pivot shaft and the pivot housing.

Pivot connection 12 pivotally connects the tracking roller assembly 12 to the mounting frame 34 so that the tracking roller assembly 12 can pivot thereabout. In one approach, the pivot connection 12 is inclined in an upstream direction and includes a pivot shaft 100 rotatably housed within a pivot casting or housing 102 so that the pivot shaft 100 can rotate relative to pivot housing 102. The pivot housing 102 defines an inner, generally cylindrical hollow chamber in which the pivot shaft 100 rotates. The pivot chamber includes a bearing for engaging the pivot shaft 100 as it rotates. The bearing may include any type of bearing for reducing the friction of the pivot shaft 100 against the inner surface of the housing 102, although an extremely low friction material such as PTFE (Teflon) is preferred that does not require lubrication which can otherwise attract dust and other conveyed materials and debris an eventually cause the pivot connection 12 to seize so that the pivot shaft 100 does not pivot freely within the pivot housing 102. To this end, the bearing is preferably in the form of generally cylindrical bushings 103 (FIG. 12) with openings for receiving the pivot shaft 100 for rotation therein. The bushings 103 are preferably formed of PTFE to reduce the frictional losses between the pivot shaft 100 and the pivot housing 102 without quickly wearing.

As illustrated in FIG. 7, the pivot housing 102 is connected to the support shaft 40 of the mounting frame 34 and is connected at a generally lateral central position thereof to the upstream lower inclined surface 68 of the support shaft 40. As mentioned previously, to provide the upstream inclined pivot axis 72 of the pivot connection, the support shaft 40 is tilted so that a lower downstream surface 68 is inclined in the upstream direction. In this regard, with the pivot housing 102 connected to the upstream lower surface 68, the pivot housing 102 and the pivot shaft 100 positioned therein are inclined at generally the same angle as the upstream surface 68.

With the pivot housing 74 bolted to the upstream inclined surface 76, as illustrated in FIG. 4, so that the pivot casting 74 is inclined in the upstream direction, the pivot shaft 100 is captured within the pivot housing 102 center cylindrical chamber as described above, so that the pivot shaft 100 is also inclined in the upstream direction and rotates therein about the inclined pivot axis 72. Top portion 104 and bottom portion 106 of the pivot shaft 100 extend through upper and lower openings 106 in the pivot housing 102 so they are exposed beyond the pivot housing 102. In this manner, the top and bottom portions 104 and 106 are received through apertures 98 in the upper and lower tab extensions 92 and 96 of the support brackets 88 and 90 and attached thereto so that they are configured to rotate with the pivot shaft 100. In this regard, the tracking roller assembly 12 is pivotable about the pivot connection 16, and more particularly about the upstream inclined pivot axis 72 as the pivot shaft 100 rotates within the pivot housing 100.

The angle at which the pivot axis 72 is inclined in the upstream direction is selected to maximize the both the corrective actions of the tracking roller 16 by lifting the one end portion 18 upwardly and shifting it downstream, and the responsiveness of the belt tracking apparatus 2 to belt mistracking by not requiring an excessive energizing torque to cause the tracking roller 14 to pivot about the pivot connection 16. To this end, by way of example only and not by limitation, the pivot connection 16 and pivot axis 72 are preferably inclined in the upstream direction at approximately 24 degrees to the longitudinal direction.

Turning to more of the details, the pivot shaft 72 includes a center bore 108 extending generally upward from the bottom portion 106 into the pivot shaft 100. The center bore 108 includes inner threads that threadingly mate with a bolt 110 for connecting the pivot shaft 100 to the upper and lower brackets 88 and 90. To this end, with top and bottom portions 104 and 106 of the pivot shaft 100 extending through the apertures 98 of the tabs 92 and 96, the bolt 119 is tightened and secured to the pivot shaft 100 to attach the upper and lower brackets 88 and 90 to the pivot shaft 100.

Referring to FIG. 1A, a pivot connection cover or shield 111 may be provided for covering and protecting the pivot axis from debris and conveyed materials, which could otherwise get caught within the pivot connection 12, and more specifically between the pivot shaft 100 and the bushings 103, causing abrasion of the materials and decreasing the life performance of the pivot connection 12. The pivot connection shield 111 may be formed of a flexible material and configured to reduce interference between the pivot connection 12 and the pivotal support frame 30 pivoting about the pivot connection 12. The cover 111 includes a cap 115 with tapered side portions 115A. FIG. 1B illustrates another approach for a pivot connection cover 111B having a different configuration than the cover 111 with a cap 117 having open side portions 117A.

Referring to FIGS. 1 and 5, with the tracking roller 14 rotatably connected to the pivotal support frame 30 and the pivotal support frame 30 pivotally coupled to the pivot connection 16, as described previously, the tracking roller 14 is configured to rotate about a roller axis 112 and pivot about the pivot axis 72 with the pivotal support frame 30. As mentioned previously, the tracking roller 14 is an idler type roller configured to rotate about its roller axis 112 and having support pins positioned on opposite ends thereof for being mounted in the apertures 86 of the upright supports 82. During operation, the belt tracking assembly 2 is positioned so that the support frame 30 supports the tracking roller 14 to rotate in engagement with the conveyor belt 4 as it travels thereover. To this end, the tracking roller 14 has an outer surface 114 formed of a relatively high friction material, e.g. steel or rubber, to decrease slipping between the tracking roller 14 and the belt 4. In this manner, drag forces acting on the roller surface 114 in the downstream direction from the conveyor belt 4 traveling thereover cause rotation of the roller about the pivot axis 112.

During operation, with the conveyor belt 4 traveling in the downstream direction 10 along the generally longitudinal belt travel path 6, the drag forces acting across the roller surface 114 are generally equal across the lateral width of the tracking roller 14, such that the tracking roller 14 is in a neutral position as illustrated in FIG. 2. In the neutral position, the tracking roller 14 and the roller axis 112 thereof extend generally transversely to the belt travel direction 10 so that the tracking roller 14 does not provide corrective action to the conveyor belt 4 and the belt 4 continues to travel along the belt travel path 6. In addition, when the tracking roller is in the neutral position, the end portions 18 and 20 thereof are positioned at approximately the same vertical height.

Figure 15A:
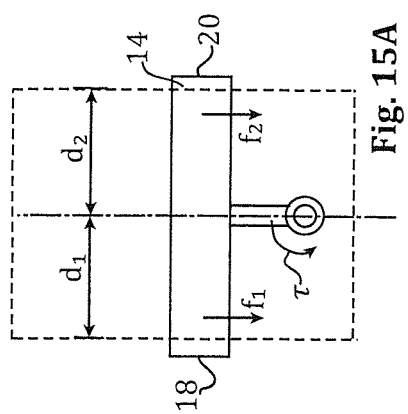
FIGS. 15A-15C are simplified diagrammatic views of the belt tracking apparatus showing the forces acting on a tracking roller positioned upstream of a pivot connection when a conveyor belt mistracks toward one end portion of the tracking roller.
Figure 15B:
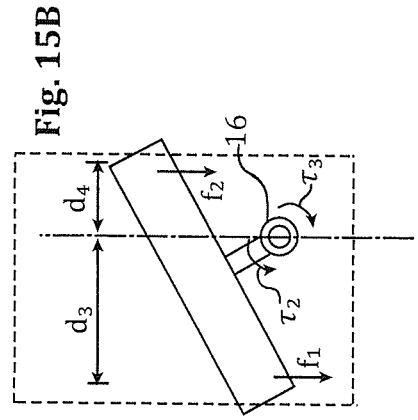

Referring to FIGS. 2 and 15A and 15B, which illustrate a simplified system showing the forces generated on the tracking roller 14 positioned upstream of the pivot connection 16, as mentioned previously, the pivot connection 16 is positioned downstream of the tracking roller 14 and the pivotal support frame 30. In this configuration, as the conveyor belt 14 mistracks toward the one lateral end portion 18 of the tracking roller 14, the drag forces acting in the downstream direction on the tracking roller 14 from the conveyor belt 6 will increase toward the end portion 18. The increased drag force $f_1$ acting toward the one end portion 18 of the tracking roller 14 will create an energizing torque $\tau$ acting about the pivot connection 16 toward the end portion 18, in the counterclockwise direction in FIG. 2, which will cause the pivotal support frame 30 and tracking roller 14 to slew about the pivot connection 16 such that the one end portion 18 will shift downstream while the opposite end portion 20 will shift upstream so that the tracking roller 14 is in a slewed orientation as illustrated in FIG. 15B for steering the conveyor belt 4 back toward the belt travel path 6. The slewing of the tracking roller 14 provides a first corrective action of the tracking roller 14 for tracking the conveyor belt.

In addition, because the pivot connection 16 is inclined in the upstream direction, as mentioned previously, when the pivotal support frame 30 pivots about the pivot connection 16, the one end portion 18 also shifts upwardly as it shifts downstream while the opposite end portion 20 shifts downwardly. In this tilted configuration, the raised end portion 18 will increase the tension in the mistracked lateral edge 22 of the belt 4 traveling thereover. The increased tension in the mistracked edge 22 will provide a second corrective force to urge the belt 4 to return to the belt travel path 6 because the belt will move away from a position of uneven and high tension to a position of more uniform and lower tension thereacross. However, to shift the one end portion 18 upwardly, resistances from the weight of the belt 4 and the increased tension in the mistracking lateral edge 22 must be overcome. In this regard, a sufficient energizing torque $\tau$ must be provided about the pivot connection 16 to pivot the pivotal support frame 30 thereabout so that the end portion 18 shifts upwardly.

To this end, because the tracking roller 14 is positioned upstream of the pivot connection 16, the system is dynamically unstable such that the larger drag forces $f_1$ acting toward the one end portion 18 relative to the opposite end portion 20 will provide sufficient energizing force to lift the one end portion 18 as described to overcome the belt weight and increased tension in the lateral edge 22. More particularly, without being bound by theory, it is believed that the downstream positioning of the pivot connection 16 relative to the tracking roller 14 causes the end portion 18 to also shift laterally outwardly as the tracking roller 14 pivots about the pivot connection 16 in response to belt mistracking toward the end portion 18. Accordingly, with reference to FIG. 15B, with the one end portion 18 positioned at a distance $d_3$ further laterally from the pivot connection 16 than the distance $d_1$ in the neutral position of FIG. 15A, the torque $\tau_2$ created by the drag forces $f_1$ acting on the one end portion 18 is magnified in the counterclockwise direction in FIG. 15B, while the counteracting torque $\tau_3$ in the opposite clockwise direction is further reduced since the opposite end portion 20 is shifted laterally closer to the pivot connection 12 at a distance $d_4$. In this regard, the dynamic instability created by the downstream positioning of the pivot axis 16 is sufficient to energize the pivotal support frame 30 to shift the end portion 18 upwardly against the resistance.

Figure 15C:
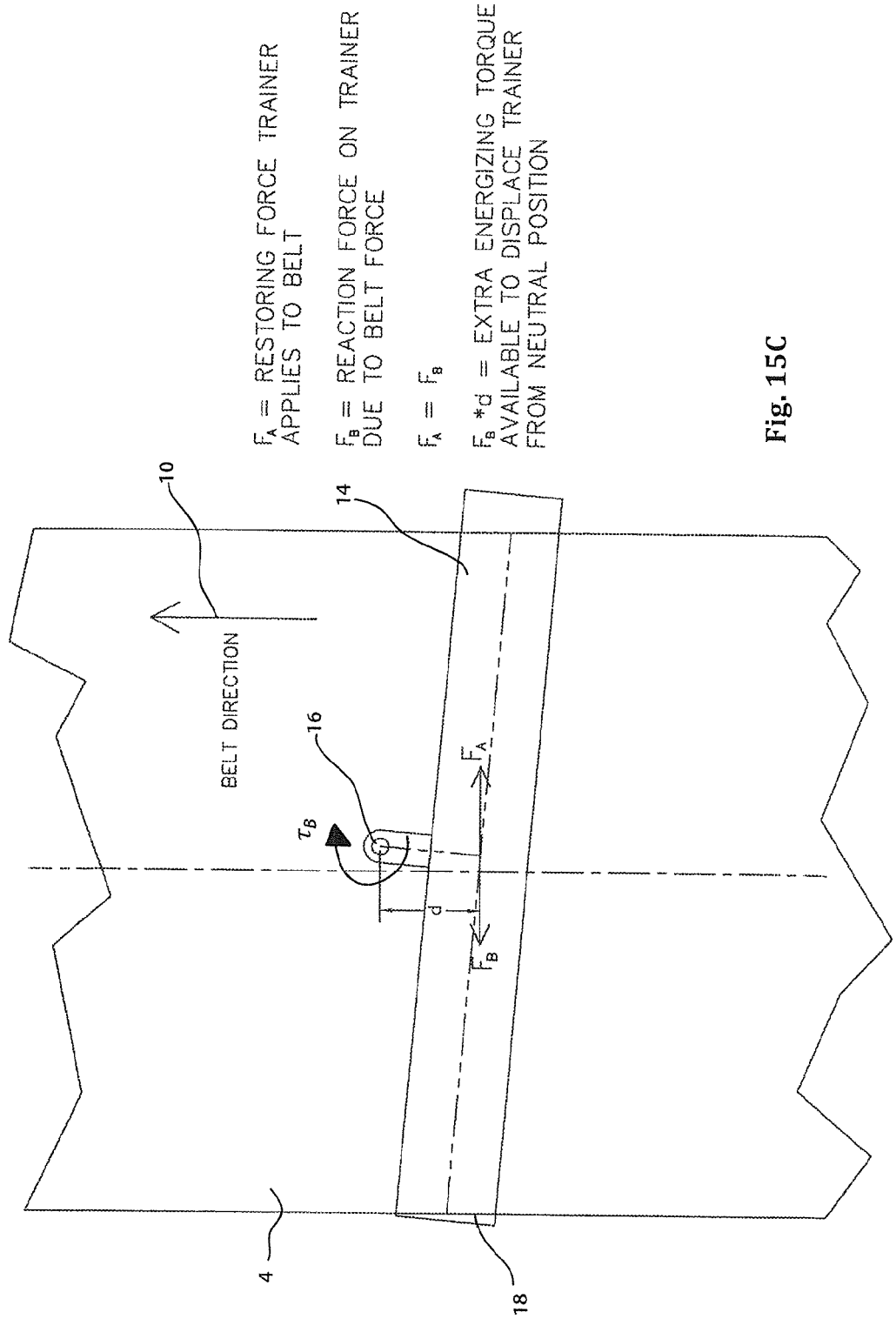

Referring to FIG. 15C, in a similar manner, the restoring force $F_A$ that the tracking roller 14 applies to the conveyor belt 4 to urge the belt 4 to return to the belt travel path 6, will create a generally equal reaction force $F_B$ on the tracking roller 14 in the opposite direction further energizing the tracking roller 14 to pivot about the pivot connection 16. More particularly, because the reaction force $F_B$ acts laterally generally toward the end portion 18 toward which the belt 4 is mistracking (to the left in FIG. 15C) at a distance d upstream from the pivot connection 16, the reaction force $F_B$ will provide an additional energizing torque $\tau_B$, in addition to the torque described above, in the counterclockwise direction for further energizing the tracking roller to pivot about the pivot connection.

Figure 16A:
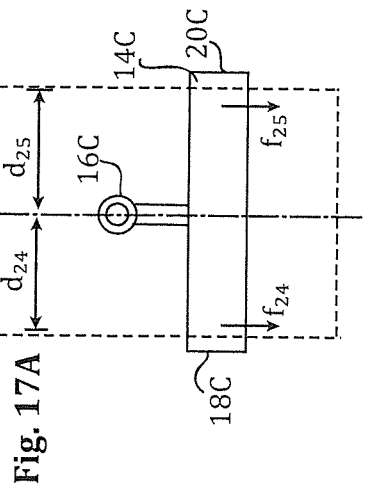
FIGS. 16A and 16B are simplified diagrammatic views for comparison purposes of the forces and movement of a tracking roller positioned directly above a pivot connection when a conveyor belt mistracks toward one end portion of the tracking roller.
Figure 16B:
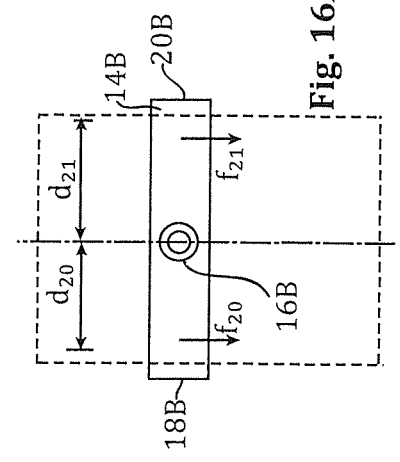

For comparison only, with regard to FIGS. 16A and 16B, a system is shown in which a tracking roller 14B is positioned directly above a pivot axis 16B. In this system, when the belt mistracks toward the end portion 18B the drag forces $f_{20}$ acting on this end portion 18B will increase creating a torque to rotate the tracking roller 14B about the pivot axis 16B as illustrated in FIG. 16B. However, because the tracking roller 14B is positioned directly above the pivot connection 16B the lateral distance $d_{20}$ between the end portion 18B and the pivot connection 16B actually decreases to reduce the torque $\tau_{20}$ acting about the pivot axis caused by the force $f_{22}$ in FIG. 16B.

Figure 17A:
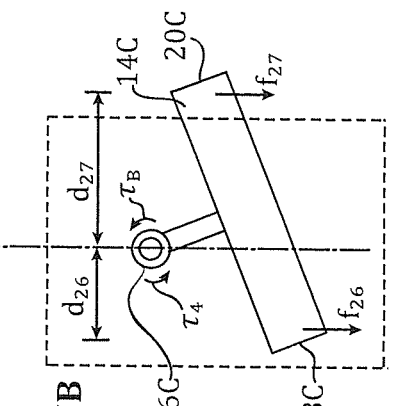
FIGS. 17A and 17B are simplified diagrammatic views for comparison purposes of the forces and movement of a tracking roller positioned downstream of a pivot connection when a conveyor belt mistracks toward one end portion of the tracking roller.
Figure 17B:
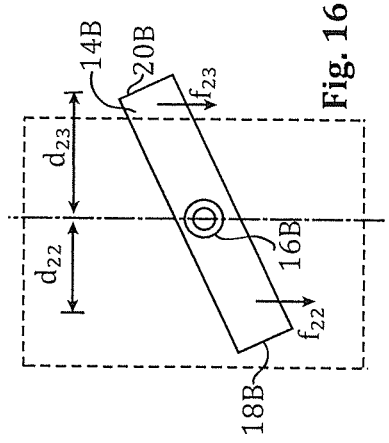
Figure 18B:
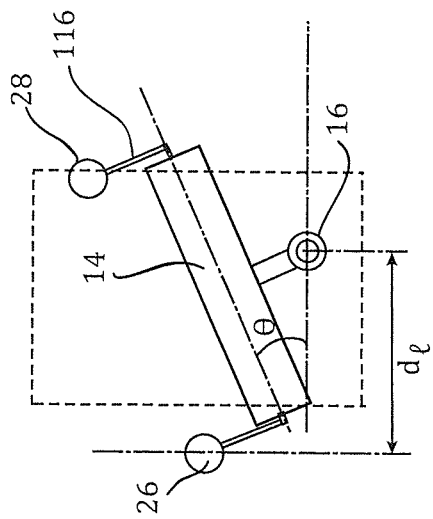
FIGS. 18A and 18B are simplified diagrammatic views of the belt tracking apparatus showing the effect of forces acting on the sensor roller during engagement with an edge of a conveyor belt when the belt mistracks.

Similarly, with reference to FIGS. 17A and 17B, a system with a tracking roller 14C positioned downstream of a pivot connection 16C is illustrated for comparison. In this system, when a conveyor belt mistracks toward the one end portion 18C, the drag forces in this end portion are increased. However, because the tracking roller 14C is positioned downstream of the pivot connection, the end portion 18C will actually shift laterally inward, substantially reducing the distance $d_{26}$ between the end portion 18C and the pivot connection 16C, thereby decreasing the energizing torque $\tau_{21}$ acting about the pivot connection 16C caused by the drag force $f_{26}$ so that the tracking roller will tend to return to the neutral position. In addition, because the tracking rollers 14B and 14C in FIGS. 16A-17B have end portions 18B and 18C that move laterally inward upon mistracking of the belt, the belt lateral edge may shift off the edge of the tracking rollers to reduce the effectiveness of their being able to track the conveyor belt back to a belt travel path. In addition, the reaction force $F_B$ between the belt and the tracking roller 14C in response to the restoring force $F_A$ that the tracking roller 14C applies to the belt, as described previously, will actually de-energize the tracking roller 14C in a system having an upstream pivot connection 16C. More specifically, the reaction force $F_B$ will act in the opposite lateral direction from the shifting end portion 18C, creating additional de-energizing torque $\tau_B$ about the pivot connection 16C. In this regard, as the tracking roller 14C shifts to the belt correcting orientation illustrated in FIG. 18B, the reaction force $F_B$ will act toward the end portion, creating a torque about the pivot connection 16C tending to pivot the tracking roller 14C in the opposite clockwise direction as illustrated in FIG. 17B, away from the belt correcting orientation.

As best shown in FIG. 2, the tracking roller 14 extends laterally slightly beyond each lateral edge 22 and 24 of the conveyor belt 4 when the tracking roller 14 is in the neutral position and the belt 4 is traveling along the belt travel path 6. More specifically, by example only and not limitation, the tracking roller 14 is about three inches wider than the conveyor belt 4 so that the tracking roller 14 extends about 1.5 inches beyond each lateral edge 22 and 24 thereof. In this manner, upon initial mistracking of the belt 4 toward one end portion 18, the mistracking lateral edge 22 of the belt does not shift laterally off of the end of the tracking roller 14. The two corrective actions for tracking the belt back to the belt travel path, i.e. tilting and slewing of the tracking roller 14, are enhanced because substantially the entire width of the conveyor belt 4 engages the tracking roller 14 increasing the contact area therebetween. Similarly, since the tracking roller 14 will shift laterally in the direction of belt mistracking due to the downstream positioning of the pivot connection 16, as described previously, if the belt continues to mistrack toward the end portion 18, the end portion 18 will shift laterally therewith to remain under the lateral edge 22 of the belt so that the edge 22 does not shift off the end of the tracking roller 14.

In addition, because the pivot connection 16 is inclined upstream so that the one end portion 18 shifts upwardly against the conveyor belt 4 passing thereover, the greater extent to which the tracking roller pivots about the pivot connection 12 creates greater resistance to further pivoting. Thus, to restrict the dynamic instability caused by the downstream location of the pivot axis from causing the tracking roller to over-pivot or get stuck in the belt correcting orientation, the tension in the lateral edge and the belt and the weight of the conveyor belt traveling over the end portion restrict the end portion from shifting upwardly to a large degree. Further, as the tracking roller guides the mistracked belt to return toward the belt travel path 6, the drag forces acting on the one end portion 18 will decrease, while the drag forces acting on the opposite end portion 20 will increase such that the training roller will pivot in the opposite direction (clockwise in FIG. 15B) so that the tracking roller 14 returns to the neutral position.

In addition, in one approach, the belt tracking apparatus 2 includes the sensor rollers 26 and 28 positioned on opposite lateral sides of the pivotal support frame 30 and adjacent to the lateral edges 22 and 24 of the conveyor belt 4 to provide additional energizing torque to pivot the pivotal support frame 30 about the pivot connection 16. The sensor rollers 26 and 28 have generally vertical rotational axes, and are rotatably mounted to the pivotal support frame 30 upstream of the tracking roller 14. In this manner, when the conveyor belt 4 mistracks toward one of the sensor rollers 26 by a sufficient amount, the lateral edge 22 will engage the sensor roller 26, to apply an energizing force thereto. The energizing force can be resolved into lateral and longitudinal components $f_7$ and $f_8$ acting respectively laterally outwardly and downstream. In this regard, because the sensor roller 26 is mounted to the pivotal support frame, and positioned upstream and laterally away from the pivot connection 16, the forces will create an energizing torque $\tau_4$ in the counterclockwise direction, further energizing the pivotal support frame 30 and the tracking roller 14 rotatably connected thereto to pivot counterclockwise about the pivot connection 16 to shift the one end portion 18 downstream and upwardly.

To magnify the effect of the force acting laterally outwardly on the sensor roller 26 for pivoting the tracking roller assembly 12, sensor roller assemblies 25 are provided to contact the mistracking conveyor belt edges to pivot the tracking roller assembly 12. More specifically, a sensor frame 23 with sensor or lever arm portions 116 is fixedly mounted to the pivotal support frame and cantilevered upstream therefrom for rotatably mounting the sensor rollers 26 and 28 upstream of the tracking roller 14 and pivot connection 16. The sensor frame 23 includes transverse arm portions 130 and 134 for the transverse translatable connections with the sensor roller 26. The fixed connection provides a one-to-one correspondence between the angular distance that tracking roller 14 end portions and the corresponding sensor rollers 26 and 28 rotate about the pivot connection 16. In one approach, the sensor rollers 26 and 28 are rotatably mounted at or adjacent to upstream end portions 118 of the arm portions 116. In this manner, when the belt 4 mistracks toward and engages the sensor roller 26 during operation, the long torque arm between the force acting laterally on the sensor roller and the pivot connection will create a relatively large amount of torque for a relatively small amount of force. In one approach, illustrated in FIG. 5A, the arm portions 116 are rigidly or fixedly mounted to the pivotal support frame by welding downstream end portions 117 the arm 116 to upstanding portions 119 of the pivotal support frame. In another approach, illustrated in FIG. 5B, a support member 121 is welded to the upstanding portion 119, and the upstream portion 117B is bolted to the support member 121 to allow removal of the sensor roller assemblies 23 from the pivotal support frame.

Figure 18A:
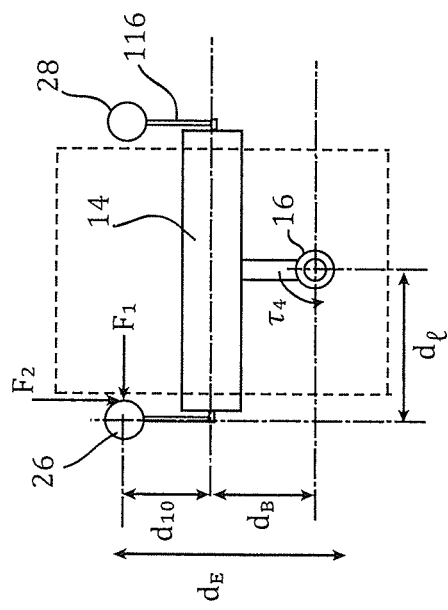

As mentioned previously, as the tracking roller assembly 12 pivots about the pivot connection 16, the end portion 18 of the tracking roller 14 shifts laterally outward. In this event, the sensor roller 26 will also shift laterally outward by a greater extent than the tracking roller end portion 18 because it is positioned upstream thereof. Thus, to reduce the amount of lateral movement of the sensor roller 26 while still achieving a sufficient amount of pivoting of the tracking roller assembly 12 to correct belt mistracking, the arm portions 116 are relatively short so that the sensor rollers 26 and 28 are rotatably mounted at a relatively small distance $d_{10}$ upstream of the tracking roller 14. In this regard, a relatively small amount of lateral shifting of the sensor roller as it moves from $d_{L1}$ to $d_{L2}$ in FIGS. 18A and 18B can provide a sufficiently large pivoting angle θ of the tracking roller 14 about the pivot connection 16. In one approach, the lever or arm portions 116 extend upstream by a distance $d_{10}$ of less than about 2 times the diameter $D_r$ of the tracking roller. More preferably the arm portions 116 extend upstream by a distance $d_{10}$ of less than about 1.5 times the diameter $D_r$ of the tracking roller. In another preferred form, the arm portions 116 extend upstream by a distance $d_{10}$ of less than the diameter $D_r$ of the tracking roller. By way of example and not limitation, the diameter of the tracking roller is about 6 inches and the arm portion 116 is configured so that a sensor roller axis 120 is positioned upstream of the tracking roller axis 112 by about 8.39 inches.

In addition, because the extension portion 74 positions the tracking roller 14 upstream of the pivot connection 16, longitudinally between the sensor rollers 26 and 28 and the pivot connection 16, the longitudinal distance $d_E$ between the sensor rollers 26 and 28 and the pivot connection 16 is equal to the combined distances $d_{10}$ and $d_{11}$ between the sensor rollers 26 and 28 and the tracking roller 14 and between the tracking roller 14 and the pivot connection 16. By way of example, as mentioned previously, the distance $d_{11}$ between the pivot connection and the tracking roller is about 3.3 inches and the distance $d_{10}$ between the tracking roller and the sensor rollers is about 8.39 inches, so that the effective longitudinal distance $d_E$ between the sensor rollers 26 and 28 and the pivot connection 16 is about 11.69 inches. In this regard, the distance $d_{10}$ between the sensor rollers 26 and 28 and the tracking roller 14 may be relatively small to reduce the lateral movement of the sensor rollers as described, while providing a large effective torque arm distance $d_E$ between the sensor rollers 26 and 28 and the pivot connection 16 for creating a sufficient energizing torque $\tau_4$ from engagement with the lateral belt edge 22 when the belt 4 mistracks.

Similarly, because the tracking roller 14 is positioned upstream of the pivot connection 16, the drag forces acting on the end portion 18 toward which the belt mistracks provide a portion of the energizing torque required to pivot the tracking roller assembly about the pivot connection 16. Thus, the amount of energizing torque $\tau_4$ required from engagement between the belt edge 22 and the sensor roller 26 to pivot the tracking roller assembly 12 by a sufficient extent to correct belt mistracking is reduced. In this regard, the amount of pressure acting on the belt edge 22 by the sensor roller 26 is relatively small, in turn reducing the wear that the sensor rollers 26 and 28 cause on the lateral belt edges 22 and 24 over time.

In one approach, the sensor roller arm portions 116 include adjustment mechanisms 124 for adjusting the lateral positioning of the sensor rollers 26 and 28 to accommodate conveyor belts 4 of various widths. To this end, the arm portions 116 each include an adjustment mechanism 124 including a fixed support elbow or sensor frame 126 and a movable support member 128 slidable relative thereto relative thereto. To this end, the fixed support elbow 126 includes a first longitudinal portion 130 cantilevered upstream from the pivotal support frame 30. The longitudinal elongate arm portion 130 includes an elongate slot 132. The fixed connection elbow 108 also includes a second lateral portion 134 extending generally laterally at the end of the opposite end of the longitudinal portion 130, transversely thereto. The lateral elongate arm portion 134 also includes a slot 136 extending laterally therealong. The movable support or adjustable mounting arm member 128 rotatably supports the sensor roller 26 at an upstream end portion thereof and slidably connects to the fixed elbow support. To this end, the movable support member 128 has a longitudinal translatable or slidable connection 138 with the longitudinal slot 132 in the longitudinal portion 130 at a generally downstream end thereof. The movable support member also includes a lateral translatable or slidable connection 142 with the lateral slot 136 at a position intermediate the longitudinal slidable connection 138 and the sensor roller 26.

The adjustable mechanism also includes an actuator 144 for adjusting the lateral position of the sensor roller 26 by moving the lateral slidable connection 140 along the lateral portion 134 so that the sensor roller 26 is moved toward and away from the conveyor belt edge 22. To this end, the actuator 144 actuates a screw drive including a threaded shaft 146. The actuator in one form includes a hexagonal head end portion 148 of the threaded shaft 146 positioned at the lateral edge of the adjustment mechanism 124. The lateral slidable connection 142 includes a drive member with a threaded through bore that has the threaded adjustment or drive shaft 146 extending therethrough and threaded therein such that turning the hexagonal end portion 148 drives the lateral slidable connection 142 along the shaft 146 within the lateral slot 136. The laterally outward positioning of the actuator 148 advantageously allows an operator to access the actuator to rotate it and adjust the lateral positioning of the sensor roller without having to reach underneath the conveyor belt.

The movable support member 128 is configured such that any movement of the lateral slidable connection 142 within the lateral slot 136 causes the longitudinal slidable connection 138 to simultaneously move longitudinally within the longitudinal slot 132. The longitudinal slidable connection 138 thereby provides additional support during operation from engagement of the sensor roller 26 with the conveyor belt lateral edge 22 to distribute forces from the conveyor belt to the sensor frame 126 without interfering with the lateral movement of the lateral slidable connection 142 within the lateral slot 136 to adjust the sensor roller 26 laterally. The lateral slot 136 includes generally parallel upstream and downstream walls 136 A and 136 B that restrict the slidable connection 138 from pivoting about the axis of the shaft 146 upon being contacted by the conveyor belt. In this manner, the slidable connections 142 and 138 also act as stops to restrict the sensor roller 26 from pivoting about a longitudinal axis of the threaded shaft 146. Locking devices are also provided to secure the sensor rollers 26 and 28 relative to the sensor frame during operation. To this end, the slidable connections 142 and 138 in one approach include anchor bolts that can be locked relative to the sensor frame 126 to restrict movement along the slots 132 and 136 during conveyor belt operation.

In one approach, load distributing members are fixed to the pivotal support frame and have a bearing interface with the mounting frame 34 to distribute the load from the conveyor belt passing over the tracking roller 14 to the mounting frame 34 to reduce the moment to which the pivot connection 12 is subjected during operation. More particularly, outrigger members 150 extend from the pivotal support frame 30 and engage the mounting frame 34 to reduce localized bending moments that are generated across the support member 76 and the pivot connection 16 during operation. During operation of the belt tracking assembly 2, large stresses may be created at the lateral end portions 18 and 20 of the roller 14 and applied to end portions of the support member 76 due to the weight of the belt 4 and tension therein and drag forces generated at these end portions 18 and 20. In addition, because the entire tracking roller assembly 12 is cantilevered from the pivot connection 16 as described previously and supports the weight of the conveyor belt 4 traveling thereover, large stresses may also be applied to the pivot connection 16. The outrigger members 150 are provided to disperse these bending moments and stresses across a larger area to reduce localized strain in the support member 76 and the pivot connection 16.

To this end, the elongate outrigger members 150 are connected at one end portion 152 to the pivotal support frame 30 where they are spaced on opposite lateral sides of the pivot connection 16. The opposite interface end portions 154 engage the mounting frame 34 on a lower downstream interface surface 70 thereof. In this manner, stresses applied to support member 76 end portions and to the pivot connection 16 are applied through the outrigger members 150 to the mounting frame 34 so that the stresses are dispersed across the lateral distance between the outrigger portions to reduce the localized bending moment that may otherwise exist at the lateral center of the support member 76 and the pivot connection 16.

In one approach, as shown in FIGS. 3 and 6, the interface is formed by the inclined lower downstream surface 70 of the support shaft 40. The interface end portions 154 include rollers for riding along the interface surface 70 to reduce friction between the interface end portion 154 and the interface surface 70 as it moves there along. Because the support shaft 40 is formed of square tubing as described previously, the downstream lower surface 70 is orthogonal to the upstream lower surface 68 and the pivot connection 16 connected thereto. In this regard, as the pivotal support frame 30 pivots about the pivot connection 16, the interface end portions 154 will move in a plane parallel to the interface surface 70 such that the engagement between the interface end portions 154 and the interface surface 70 do not create substantial interference to the pivoting of the pivotal support frame 30 about the pivot connection 16 when the belt mistracks as described previously. The end rollers 156 reduce friction between the interface end portions 154 and the interface surface 70 to further reduce interference to the pivoting of the pivotal support frame.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A conveyor belt tracking apparatus for a conveyor belt that travels downstream in a downstream travel direction, the conveyor belt tracking apparatus comprising:
    an elongate tracking roller for extending laterally across and under the belt;
    a laterally extending pivotal support frame for rotatably supporting the tracking roller to rotate in engagement with the belt traveling in the downstream travel direction thereover;
    opposite end portions of the tracking roller that are shifted so that one of the end portions is further downstream than the other end portion when the belt mistracks toward the one end portion during the downstream travel thereof;
    an inclined pivot member that pivotally mounts the pivotal support frame generally centrally therealong for pivoting thereabout and having a pivot axis that is inclined in an upstream direction with an upper end of the pivot member further upstream than a lower end thereof such that the tracking roller one end portion shifts upwardly as the one end portion is shifted further downstream; and
    a downstream pivot connection between the pivotal support frame and the inclined pivot member which is generally downstream from the tracking roller so that the tracking roller is cantilevered upstream from the inclined pivot member and mistracking of the belt toward the tracking roller one end portion causes the one end portion that is shifted further downstream to also shift further laterally from the pivot axis.

2. The conveyor belt tracking apparatus of claim 1, wherein the pivot member is fixed downstream from the tracking roller to be centered relative to the tracking roller end portions so that as the one end portion of the tracking roller shifts downstream, the tracking roller one end portion also shifts further laterally from the pivot axis.

3. A conveyor belt tracking apparatus for a conveyor belt that travels downstream in a downstream travel direction, the conveyor belt tracking apparatus comprising:
    an elongate tracking roller for extending laterally across and under the belt;
    a laterally extending pivotal support frame for rotatably supporting the tracking roller to rotate in engagement with the belt traveling in the downstream travel direction thereover;
    opposite end portions of the tracking roller that are shifted so that one of the end portions is further downstream than the other end portion when the belt mistracks toward the one end portion during the downstream travel thereof;
    an inclined pivot member that pivotally mounts the pivotal support frame generally centrally therealong for pivoting thereabout and having a pivot axis that is inclined in an upstream direction such that the tracking roller one end portion shifts upwardly as the one end portion is shifted further downstream;
    a downstream pivot connection between the pivotal support frame and the inclined pivot member which is generally downstream from the tracking roller so that the tracking roller is cantilevered upstream from the inclined pivot member and mistracking of the belt toward the tracking roller one end portion causes the one end portion that is shifted further downstream to also shift further laterally from the pivot axis; and
    a sensor roller coupled to the pivotal support frame positioned upstream of the pivot axis for engaging a lateral edge of the conveyor belt when the belt mistracks and providing an energizing force to the tracking roller to shift the one end portion thereof further downstream, upwardly, and laterally outwardly about the downstream pivot connection.

4. The conveyor belt tracking apparatus of claim 3, wherein the sensor roller is positioned upstream of the elongate tracking roller for increasing the energizing force to the tracking roller to further shift the one end portion thereof downstream and upwardly when the lateral edge engages the sensor roller when the belt mistracks.

5. The conveyor belt tracking apparatus of claim 3, wherein the sensor roller is rotatably mounted on a lever arm which is fixedly connected to the pivotal support frame for generating a relatively large rotation of the tracking roller about the pivot connection and downstream and lateral shifting of the roller one end portion for a corresponding lateral movement of the sensor roller when the belt mistracks.

6. The conveyor belt tracking apparatus of claim 3, further comprising:
a first elongate arm portion connected to the pivotal support frame;
a second elongate arm portion connected to the first elongate portion to extend transversely thereto;
an adjustment arm member supporting the sensor roller;
a first translatable connection between the adjustment arm member and the first elongate arm portion for sliding of the adjustment arm member along the first elongate arm portion; and
a second translatable connection between the adjustable arm member and the second elongate arm portion for sliding of the adjustment arm member along the first elongate arm portion so that there is simultaneous translation of the adjustment arm member along the transverse first and second elongate arm portions for adjusting the sensor roller for laterally positioning the sensor roller to accommodate conveyor belts having different widths.

7. The conveyor belt tracking apparatus of claim 6, including an actuator for driving the first and second translatable connections along the first and second elongate arm portions.

8. The conveyor belt tracking apparatus of claim 1, including a mounting frame fixed to the conveyor belt structure to extend laterally across and under the belt, wherein the pivot member pivotally mounts the pivotal support frame for pivoting relative to the fixed mounting frame, and
a load distributing member fixed to the pivotal support frame and having a bearing interface with the mounting frame for transferring load from the belt to the fixed mounting frame.

9. A conveyor belt tracking apparatus for a conveyor belt that travels downstream in a downstream travel direction, the conveyor belt tracking apparatus comprising:
an elongate tracking roller for extending laterally across and under the belt;
a laterally extending pivotal support frame for rotatably supporting the tracking roller to rotate in engagement with the belt traveling in the downstream travel direction thereover;
opposite end portions of the tracking roller that are shifted so that one of the end portions is further downstream than the other end portion when the belt mistracks toward the one end portion during the downstream travel thereof;
an inclined pivot member that pivotally mounts the pivotal support frame generally centrally therealong for pivoting thereabout and having a pivot axis that is inclined in an upstream direction such that the tracking roller one end portion shifts upwardly as the one end portion is shifted further downstream;
a downstream pivot connection between the pivotal support frame and the inclined pivot member which is generally downstream from the tracking roller so that the tracking roller is cantilevered upstream from the inclined pivot member and mistracking of the belt toward the tracking roller one end portion causes the one end portion that is shifted further downstream to also shift further laterally from the pivot axis;
a mounting frame fixed to the conveyor belt structure to extend laterally across and under the belt, wherein the pivot member pivotally mounts the pivotal support frame for pivoting relative to the fixed mounting frame; and
a load distributing member fixed to the pivotal support frame and having a bearing interface with the mounting frame for transferring load from the belt to the fixed mounting frame,
wherein the load distributing member includes a pair of elongate outrigger members mounted at one end portion thereof to the pivotal support frame on each side of the pivot member and wherein the bearing interface includes a wheel rotatably mounted to an opposite end of the outrigger members to ride along an interface surface of the mounting frame.

10. The conveyor belt tracking apparatus of claim 1, including a cover extending over the pivot connection to block conveyed material from access to the pivot connection.

11. A conveyor belt tracking device for a conveyor belt traveling in a downstream travel direction, the conveyor belt tracking device comprising:
an elongate tracking roller for extending in a lateral direction across and below the conveyor belt;
a stationary mounting frame extending in the lateral direction across and below the conveyor belt for being fixed to conveyor belt support structure on either side of the conveyor belt;
an elongate pivotal support frame extending in the lateral direction across the conveyor belt for supporting the tracking roller in rotatable engagement with the conveyor belt;
a downstream pivot connection between the pivotal support frame and the stationary mounting frame fixed generally centrally between opposite end portions of the elongate tracking roller and downstream therefrom such that one of the end portions of the tracking roller shifts downstream about the pivot connection when the conveyor belt mistracks toward the one end portion;
a sensor assembly including a sensor frame and a sensor mounted thereto with the sensor frame fixedly mounted to the pivotal support frame against pivoting relative thereto to position the sensor adjacent to one lateral edge portion of the conveyor belt so that mistracking of the belt toward the sensor causes the belt to contact the sensor and shift the sensor downstream and laterally outwardly; and
an operative, fixed connection between the sensor and the sensor frame during conveyor belt operation so that the sensor roller and the tracking roller pivot about the pivot connection by the same angular amount as the one end portion of the tracking roller pivots about the downstream pivot connection.

12. The conveyor belt tracking device of claim 11, wherein the sensor includes a sensor roller rotatably mounted to the sensor frame and configured to roll along the lateral edge portion of the conveyor belt during mistracking of the belt.

13. A conveyor belt tracking device for a conveyor belt traveling in a downstream travel direction, the conveyor belt tracking device comprising:
an elongate tracking roller for extending in a lateral direction across and below the conveyor belt;
a stationary mounting frame extending in the lateral direction across and below the conveyor belt for being fixed to conveyor belt support structure on either side of the conveyor belt;
an elongate pivotal support frame extending in the lateral direction across the conveyor belt for supporting the tracking roller in rotatable engagement with the conveyor belt;
a downstream pivot connection between the pivotal support frame and the stationary mounting frame fixed generally centrally between opposite end portions of the elongate tracking roller and downstream therefrom such that one of the end portions of the tracking roller shifts downstream about the pivot connection when the conveyor belt mistracks toward the one end portion;

a sensor assembly including a sensor frame and a sensor mounted thereto with the sensor frame fixedly mounted to the pivotal support frame to position the sensor adjacent to one lateral edge portion of the conveyor belt so that mistracking of the belt toward the sensor causes the belt to contact the sensor and shift the sensor downstream and laterally outwardly; and an operative, fixed connection between the sensor and the sensor frame during conveyor belt operation so that the sensor roller and the tracking roller pivot about the pivot connection by the same angular amount as the one end portion of the tracking roller pivots about the downstream pivot connection, wherein the sensor includes a sensor roller rotatably mounted to the sensor frame and configured to roll along the lateral edge portion of the conveyor belt during mistracking of the belt, and wherein the sensor assembly includes a mounting member to which the sensor is rotatably mounted and has a first translatable connection between the mounting member and the sensor frame for linearly translating the sensor roller inwardly and outwardly in the lateral direction to accommodate conveyor belts of various widths.

14. The conveyor belt tracking device of claim 13, wherein the mounting member and the sensor frame include a second translatable connection there between with the first and second translatable connections each extending linearly and transverse to each other to allow the sensor roller to be adjusted in the lateral direction while providing the sensor roller resistance against pivoting while in rolling engagement with the conveyor belt during conveyor belt operation.

15. The conveyor belt tracking device of claim 13, wherein the fixed connection includes a releasable locking mechanism of the first translatable connection for fixing the mounting member relative to the pivotal support frame during operation of the conveyor belt.

16. The conveyor belt tracking device of claim 11, wherein the pivotal support frame has outrigger members mounted thereto on either side of the pivot member, and the outrigger members have a bearing interface with the mounting frame to distribute load from the conveyor belt to the mounting frame.

17. A conveyor belt tracking device for a conveyor belt traveling in a downstream travel direction, the conveyor belt tracking device comprising:
   an elongate tracking roller for extending in a lateral direction across and below the conveyor belt;
   a stationary mounting frame extending in the lateral direction across and below the conveyor belt for being fixed to conveyor belt support structure on either side of the conveyor belt;
   an elongate pivotal support frame extending in the lateral direction across the conveyor belt for supporting the tracking roller in rotatable engagement with the conveyor belt;
   a downstream pivot connection between the pivotal support frame and the stationary mounting frame fixed generally centrally between opposite end portions of the elongate tracking roller and downstream therefrom such that one of the end portions of the tracking roller shifts downstream about the pivot connection when the conveyor belt mistracks toward the one end portion;
   a sensor assembly including a sensor frame and a sensor mounted thereto with the sensor frame fixedly mounted to the pivotal support frame to position the sensor adjacent to one lateral edge portion of the conveyor belt so that mistracking of the belt toward the sensor causes the belt to contact the sensor and shift the sensor downstream and laterally outwardly; and
   an operative, fixed connection between the sensor and the sensor frame during conveyor belt operation so that the sensor roller and the tracking roller pivot about the pivot connection by the same angular amount as the one end portion of the tracking roller pivots about the downstream pivot connection,
   wherein the downstream pivot connection is inclined in the upstream direction so that when the conveyor belt contacts the sensor, the sensor shifts upwardly to shift the one end portion of the tracking roller upwardly for lifting the conveyor belt thereon.

18. The conveyor belt tracking device of claim 17, including a load distributing member fixed to the pivotal support frame and having a bearing interface with the mounting frame for transferring load from the conveyor belt to the fixed mounting frame as the one end portion of the tracking roller lifts the conveyor belt.

19. A conveyor belt tracking device comprising:
   a pivotal tracking roller assembly having a tracking roller mounted thereto for being disposed under a conveyor belt in rolling engagement therewith;
   a sensor frame member for being fixedly mounted to the pivotal tracking roller assembly for pivoting therewith;
   a conveyor belt sensor for being positioned adjacent to a lateral edge of the conveyor belt;
   a mounting member to which the conveyor belt sensor is mounted;
   a drive device for driving the mounting member relative to the sensor frame member to shift the sensor mounted to the mounting member toward and away from the lateral edge of the conveyor belt; and
   an user-operated actuator of the drive device disposed laterally outwardly from an adjacent end of the tracking roller to allow a user to access the actuator without reaching under the belt.

20. The conveyor belt tracking device of claim 19, wherein the drive device includes a screw drive mechanism having a rotatable elongate threaded shaft with the user-operable actuator being a drive head of the threaded shaft, and
   a drive member coupled to the mounting member and having a threaded bore through which the elongate shaft extends in threaded engagement therewith so that rotation of the drive head causes translation of the sensor for providing fine adjustability thereof laterally toward and away from the conveyor belt edge.

21. The conveyor belt tracking device of claim 20, wherein the frame member includes an elongate stop extending along the elongate shaft for providing resistance against pivoting of the sensor about the elongate threaded shaft while in engagement with the conveyor belt during conveyor belt operation.

22. The conveyor belt tracking device of claim 21, wherein the elongate stop includes a pair of elongate abutment surfaces extending along the elongate shaft upstream and downstream thereof.

23. The conveyor belt tracking device of claim 20, including a translatable connection between the mounting member and the sensor frame member for guiding a second portion of the mounting member transversely to the elongate threaded shaft to distribute loads from the conveyor belt contacting the sensor to the frame member.

24. The adjustable sensor device of claim 20, wherein the drive member includes a locking device for securing the drive member to the sensor frame member to restrict movement of the sensor relative to the sensor frame member during conveyor belt operation.

25. A method for correcting a travel path of a conveyor belt traveling in a downstream belt travel direction, the method comprising:
   pivotally mounting a tracking roller relative to fixed conveyor belt structure to extend laterally across and below the conveyor belt so that the tracking roller rotates as the conveyor belt passes thereover in the downstream direction;
   pivoting the tracking roller so that one end portion thereof is beyond the other end portion thereof in the downstream direction as one lateral edge portion of the conveyor belt mistracks toward the one end portion of the tracking roller for guiding the conveyor belt back toward the correct travel path;
   tilting the one end portion of the tracking roller upwardly as it pivots so that the one end portion is above the other end portion to increase tension in the mistracking conveyor belt edge portion to urge the conveyor belt toward the correct belt travel path; and
   shifting the one end portion of the tracking roller laterally outwardly as the one end portion of the tracking roller pivots downstream to maintain contact between the one end portion and the conveyor belt lateral edge portion as the conveyor belt mistracks toward the one end portion of the tracking roller.

26. The method of claim 25, wherein pivotally mounting the tracking roller includes pivotally mounting the tracking roller upstream from a pivot member fixed relative to the conveyor belt structure so that upon mistracking of the conveyor belt toward the one end portion the tracking roller pivots about the pivot member so that the one end portion shifts downstream and laterally outwardly.

27. The method of claim 25, including inclining the pivot member in the upstream direction so that pivoting the tracking roller about the pivot member tilts the one end portion upwardly to increase tension in the mistracking conveyor belt edge portion to urge the conveyor belt to return to the correct travel path.

28. The method of claim 25, including contacting a sensor roller fixed with respect to the one end portion of the tracking roller and positioned upstream thereof with the one edge portion of the conveyor belt to urge the sensor roller to shift in the downstream direction and laterally outwardly by the same angular amount as the one end portion.

29. A method of laterally adjusting a sensor roller laterally toward and away from a conveyor belt traveling in a downstream direction over a tracking roller, the method comprising:
   arranging a drive member to extend generally transverse to the direction of conveyor belt travel;
   mounting a sensor roller to be operatively connected to the drive member adjacent to a lateral edge of the conveyor belt; and
   operating an actuator that is disposed laterally outwardly of an adjacent end of the tracking roller to cause the sensor roller to be driven by the drive member toward and away from the conveyor belt edge so that actuator operation does not require that an operator reach under the conveyor belt.

30. The method of claim 29, including locking the roller against lateral movement so that the roller cannot be further adjusted.

31. The method of claim 29, including arranging stops upstream and downstream of the roller to restrict pivoting of the roller about the drive member.

32. A load distributing apparatus for distributing forces generated by a conveyor belt passing over a tracking roller that pivots about a pivot member, the load distributing apparatus comprising:
   an elongate stationary mounting frame extending across and under the conveyor belt in a lateral direction and attached at end portions thereof to conveyor structure on either side of the conveyor belt;
   a pivotal support frame for supporting the tracking roller in engagement with the conveyor belt and pivoting about the pivot member;
   load distributing members each having opposite end portions and being fixedly mounted at one of the end portions thereof to the pivotal support frame so that the one end portions are spaced on either side of the pivot member and laterally from the end portions of the stationary mounting frame with the load distributing members pivoting with the pivotal support frame; and
   a bearing interface between the other end portions of the load distributing members and the mounting frame with the other end portions engaging and shifting along the mounting frame as the load distributing members pivot to distribute forces from the conveyor belt to the mounting frame.

33. A load distributing apparatus for distributing forces generated by a conveyor belt passing over a tracking roller that pivots about a pivot member, the load distributing apparatus comprising:
   an elongate stationary mounting frame extending across and under the conveyor belt in a lateral direction and attached at end portions thereof to conveyor structure on either side of the conveyor belt;
   a pivotal support frame for supporting the tracking roller in engagement with the conveyor belt and pivoting about the pivot member;
   load distributing members having opposite end portions and being mounted at one of the end portions thereof to the pivotal support frame on either side of the pivot member; and
   a bearing interface between the other end portions of the load distributing members and the mounting frame to distribute forces from the conveyor belt to the mounting frame,
   wherein the load distributing members include elongate outrigger members, and the bearing interface includes rollers of the other end portions of the outrigger members that slide along a bearing surface of the mounting frame.

* * * * *